(12) United States Patent  (10) Patent No.: US 8,195,797 B2
Sullivan  (45) Date of Patent: Jun. 5, 2012

(54) COMPUTER NETWORK SOFTWARE AND HARDWARE EVENT MONITORING AND REPORTING SYSTEM AND METHOD

(75) Inventor: Francis Sullivan, Round Rock, TX (US)

(73) Assignee: Spiceworks, Inc., Austin, TX (US)

( * ) Notice: Subject to any disclaimer, the term of this patent is extended or adjusted under 35 U.S.C. 154(b) by 0 days.

(21) Appl. No.: 13/181,343

(22) Filed: Jul. 12, 2011

(65) Prior Publication Data

US 2012/0011251 A1    Jan. 12, 2012

Related U.S. Application Data

(60) Division of application No. 12/117,573, filed on May 8, 2008, now Pat. No. 7,984,143, and a continuation-in-part of application No. 12/041,480, filed on Mar. 3, 2008.

(60) Provisional application No. 60/917,521, filed on May 11, 2007.

(51) Int. Cl.
*G06F 13/00* (2006.01)
(52) U.S. Cl. .................. 709/224; 709/219; 719/318
(58) Field of Classification Search .................. 709/217, 709/219, 223, 224; 719/328, 329
See application file for complete search history.

(56) References Cited

U.S. PATENT DOCUMENTS

| | | | |
|---|---|---|---|
| 5,948,055 A * | 9/1999 | Pulsipher et al. ............. 709/202 |
| 6,108,782 A | 8/2000 | Fletcher et al. | |
| 6,636,239 B1 | 10/2003 | Arquie et al. | |
| 6,664,978 B1 | 12/2003 | Kekic et al. | |
| 7,133,907 B2 | 11/2006 | Carlson et al. | |
| 7,143,615 B2 | 12/2006 | Connor et al. | |
| 7,392,046 B2 | 6/2008 | Leib et al. | |
| 7,478,107 B1 | 1/2009 | Yehuda | |
| 7,624,351 B2 * | 11/2009 | Unger et al. .................. 715/763 |
| 7,685,261 B1 | 3/2010 | Marinelli et al. | |
| 7,734,712 B1 | 6/2010 | Meyer et al. | |
| 7,747,738 B2 | 6/2010 | Ellisor, Jr. | |
| 7,895,320 B1 | 2/2011 | Oggerino et al. | |
| 8,051,180 B2 * | 11/2011 | Mazzaferri et al. ........... 709/227 |
| 2002/0069271 A1 * | 6/2002 | Tindal et al. .................. 709/221 |
| 2002/0194319 A1 | 12/2002 | Ritche | |
| 2004/0054680 A1 | 3/2004 | Kelley et al. | |
| 2006/0212556 A1 | 9/2006 | Yacoby et al. | |
| 2006/0282886 A1 | 12/2006 | Gaug | |
| 2007/0033282 A1 | 2/2007 | Mao et al. | |
| 2007/0039047 A1 | 2/2007 | Chen et al. | |
| 2007/0088630 A1 | 4/2007 | MacLeod et al. | |
| 2007/0192704 A1 | 8/2007 | Bauman et al. | |

* cited by examiner

*Primary Examiner* — Viet Vu
(74) *Attorney, Agent, or Firm* — Hulsey, P.C.; William N. Hulsey, III; Loren T. Smith

(57) ABSTRACT

A method, system, and network for providing a method, system, and network, for network and device event monitoring and reporting. The disclosed subject matter associates with a host computer, a local network of information technology devices, a community of network users, and a global information technology community. The present disclosure initiates an inventory of a plurality of information technology devices associated with a local network of information technology devices. The method, system and apparatus determine change in the operational status of the plurality of the information technology devices associated with the local network. Then, the present disclosure monitors for changes in the operational status of the plurality of the information technology devices associated with the local network. The disclosed subject matter then presents to the host computer information relating changes in the operational status of the information technology devices associated with the local network. The present method and system associate changes to the operational status with a plurality of products from a set of product vendors, and those changes to the operational status with a plurality of advertisements presented in association with plurality of products.

14 Claims, 24 Drawing Sheets

COMPUTER NETWORK SOFTWARE AND HARDWARE EVENT MONITORING AND REPORTING SYSTEM AND METHOD

RELATED APPLICATIONS

This U.S. Patent Application is a continuation-in-part of pending U.S. patent application Ser. No. 12/041,480 filed Mar. 3, 2008 entitled "SYSTEM AND METHOD FOR HARDWARE AND SOFTWARE MONITORING WITH INTEGRATED RESOURCE ACQUISITION" by inventor Francis Sullivan which claims priority of U.S. Provisional Patent Application 60/892,381 filed Mar. 2, 2007, entitled "COMPUTER NETWORK INTEGRATED ASSET MANAGEMENT SYSTEM AND METHOD" by inventor Francis Sullivan. This U.S. Patent Application is a divisional of U.S. patent application Ser. No. 12/117,573, filed May 8, 2008.

This U.S. Patent Application claims priority of U.S. Provisional Patent Application Ser. No. 60/917,521, filed May 11, 2007.

FIELD

The present disclosure relates in general to the field of software, and more particularly to information technology management software.

BACKGROUND

Existing information technology (IT) management software packages have several shortcomings. Existing IT management software packages are often complicated. Often, such software packages are geared toward professional IT personnel in large businesses, neglecting small and medium sized businesses. While the presentation of large amounts of information may be beneficial in certain contexts, it is often unnecessary and overwhelming for less sophisticated IT management personnel.

Existing IT management software packages may not integrate important data into a single interface. One IT management software package may be more effective for managing one issue, while another may be more effective for another issue. An IT manager may need to review many disparate sources of information in order to effectively manage the IT infrastructure. Common management issues are often mixed with the less commonly encountered issues, making it tedious and time consuming to filter the common issues from the less common issues.

Network management software has earned a reputation as being both costly to buy and complicated to set up and use. As a result, many smaller organizations tend to forgo it, filing it under "nice to have, but not worth the expense or hassle." But, in putting off network management, a risk arises of letting a potential problem go unnoticed, or even grow worse over time. There is a need for an easy-to-use application that can inventory a network's systems and software (along with various other devices) and includes monitoring and reporting capabilities. Such a system should constitute a relatively small download that may be available via the Internet or other on-line source. The application should be able to run on either a current Microsoft Windows system such as Windows XP Professional, Window Vista Business, or Windows 2003 Server system, but it can manage all the common types of assets found in a business such as Windows 2000/XP, Mac OS X, Linux/Unix machines, printers, switches, routers, etc.

Such a network management system should use a minimum of document and other complex instructions in its use. It should also avoid the need to install software agents on every system to provide control and query capabilities. Such a system should require the installation of software on only one system, to make configuring simple in most cases.

There is a need for such a system to provide displays within a simple browser-based interface, with default setting presenting an overview of a network organized by category. Such a display should show how many workstations, servers, printers and miscellaneous devices, as well as other network information operate on the network.

There is a need for a network management system that reports all of the Microsoft® software, services and operating system updates (or hot fixes) present on each of the systems it finds. Such a system should provide a rapid path to the software manufacturer for recognized applications. A further need exists for a system that allows sifting through a great deal of network information with a built-in report generator.

With such a network monitoring system, there is the need to stay in-step with the network by monitoring events within the network. The network monitoring system needs to provide in a desktop application a way to automatically identify PCs and servers with low disk space, the presence of unwanted software on your network, the status of your anti-virus updates, printers with low toner and ink levels, and offline servers.

When problems arise in a network, there is the need for the network monitoring system to aid the IT administrator to quickly identity the cause. Such a system should enable the IT administrator and other problem solvers to see what software is on a machine that is causing it to run slowly. Moreover, there is the need for such a system to be able to compare two or machines to see what settings are different. Such a system should allow for quickly identifying the server that is running out of capacity. The desired IT network monitoring system would allows the user to easily see into an IT network to resolve problems more quickly.

Yet a further need exists for an IT network management system that includes for the users it serves a help desk function, deliver a single interface where an IT administrator may manage all daily tasks, projects and problems. There is a need for a system that may create a one-click ticket while browsing an IT network. Furthermore, such as system should allow the clients it serves to submit tickets to via email or the Web and then view the status of those tickets online. Such a system should allow for assigning tickets across an IT team, attach such tickets to hardware on the IT network, and manage projects relating to the network. Still further, there is a need for a system that can easily run reports on trouble solving tickets.

SUMMARY

In one aspect, embodiments disclosed herein relate to a computer network software and hardware event monitoring and reporting system and method that overcomes the aforesaid limitations.

In another aspect, the present disclosure provides a method, system, and network, collectively the disclosure, providing hardware and software for network and device event monitoring and reporting. The disclosed subject matter associates with a host computer, a local network of information technology devices, a community of network users, and a global information technology community. The present disclosure initiates an inventory of a plurality of information technology devices associated with a local network of information technology devices. The method, system and apparatus determine a change in the operational status of the plurality of the information technology devices associated with the local network. Then the present disclosure monitors for changes in the operational status of the plurality of the information technology devices associated with the local network. The disclosed subject matter then presents to the host computer information relating changes in the operational status of the information technology devices associated with the local network. The present method and system associate changes to the operational status with a plurality of products from a set of product vendors, and those changes to the operational status with a plurality of advertisements presented in association with plurality of products.

Other aspects and advantages of the disclosure will be apparent from the following description and the appended claims.

BRIEF DESCRIPTION OF THE DRAWINGS

The features, nature, and advantages of the disclosed subject matter may become more apparent from the detailed description set forth below when taken in conjunction with the drawings in which like reference characters identify correspondingly throughout and wherein.

DETAILED DESCRIPTION OF THE DISCLOSURE

Figure 1:
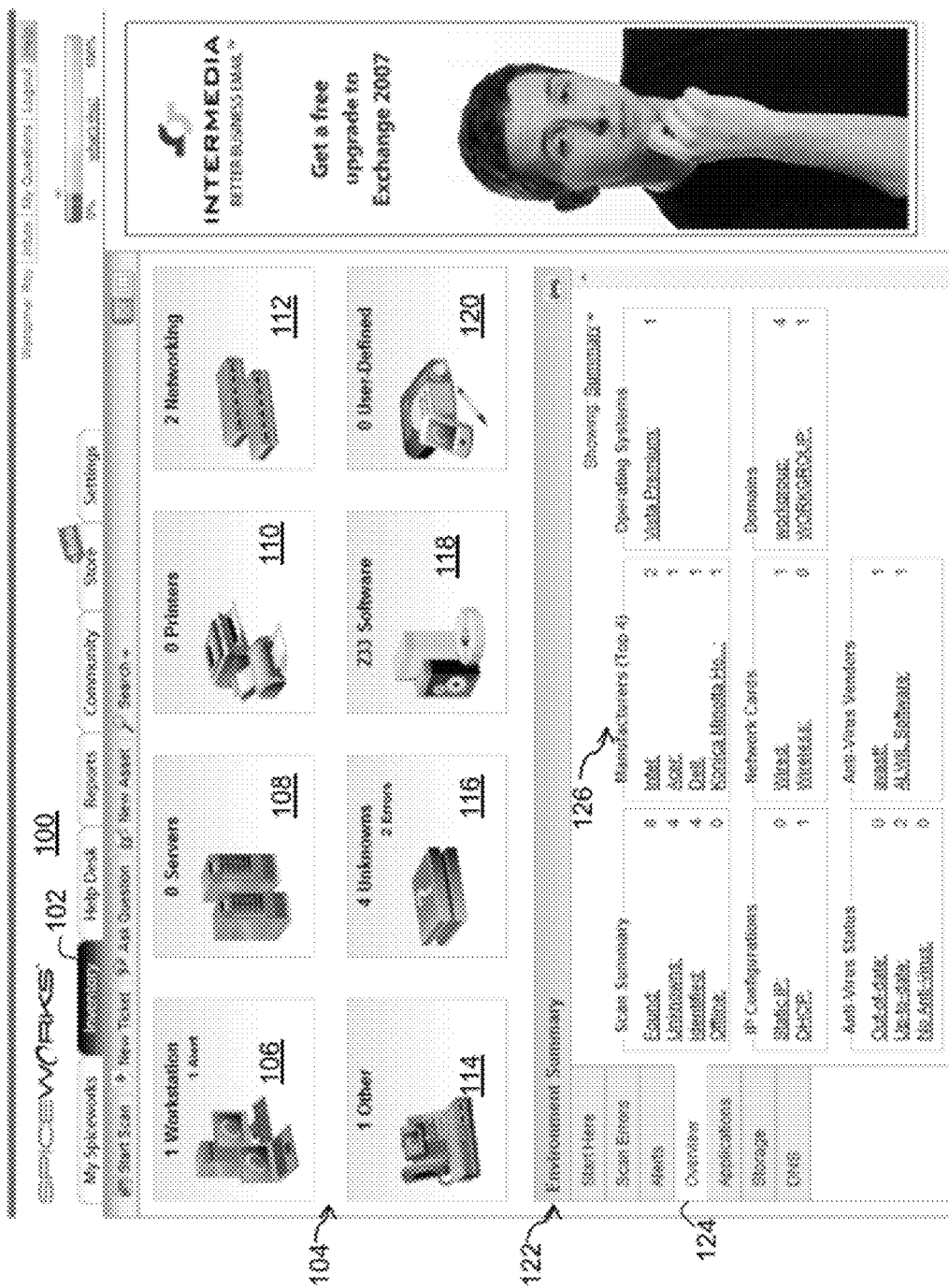
FIGS. 1 through 11 show views of the inventory tab of one embodiment of the disclosed subject matter.

Preferred embodiments of the present disclosure are illustrated in the drawings, like numbers being used to refer to like and corresponding parts of the various drawings.

The disclosed subject matter relates to IT management software. Features of the disclosed subject matter include the ability to inventory a network, run an IT help desk, monitor a network for trouble, report on a network, troubleshoot issues on a network, collaborate with IT professionals, and provide feedback for software improvement.

The disclosed subject matter allows for an inventory of all hardware, software and other assets on a network. The software allows for discovery of the Windows, Mac, and Linux PCs and servers, routers, printers and any other IP-based devices on your network. All relevant technical data plus the software, patches and services on each machine may be gathered. Other data such as number of licenses, purchase price and physical location may also be added. Other assets such as mobile phones and office furniture may also be added. All of this information may be gathered without the use of agents. All inventory information may be stored locally and securely on the network, avoiding any concerns about sensitive information being communicated over the internet.

Of particular relevance to the present disclosure is are the monitoring of events that the presently disclosed subject matter allows. Through the disclosed method and system, a network administer may quickly and easily be made aware of changes in the local area network, such as computers or peripheral devices requiring supplies or other resources. In addition, through the monitoring of such network events, it is possible to discern.

FIG. 1 shows a view 100 of an embodiment of an inventory tab 102 of the present disclosure. The inventory tab 102 allows a user to determine the hardware and software installed in an environment and to take action on that data. The top half of the screen 104 shows the major categories that assets are automatically sorted into upon discovery. In the embodiment shown, the categories include Workstations 106, Servers 108, Printers 110, Networking 112, Other 114, Unknowns 116, Software 118 and User-Defined 120. The bottom half of the screen 122 shows Overview tab 124, displaying the assets discovered in the environment and allowing a user to quickly see any issues. In the embodiment shown, the Overview tab 124 shows the top manufacturers, operating systems, anti-virus vendors and status information along with the number of assets discovered in each category. In one embodiment, underlined data indicates that a user may perform some kind of action on that data. For example, under the Manufacturers (Top 4) tab 126, if a user wishes to see assets manufactured by Dell, a user may click the Dell link to receive a filtered view of environment data. Similarly, to see all assets not manufactured by Dell, a user may hover over the Dell link and see 'Others not like this' (not shown).

Figure 2:
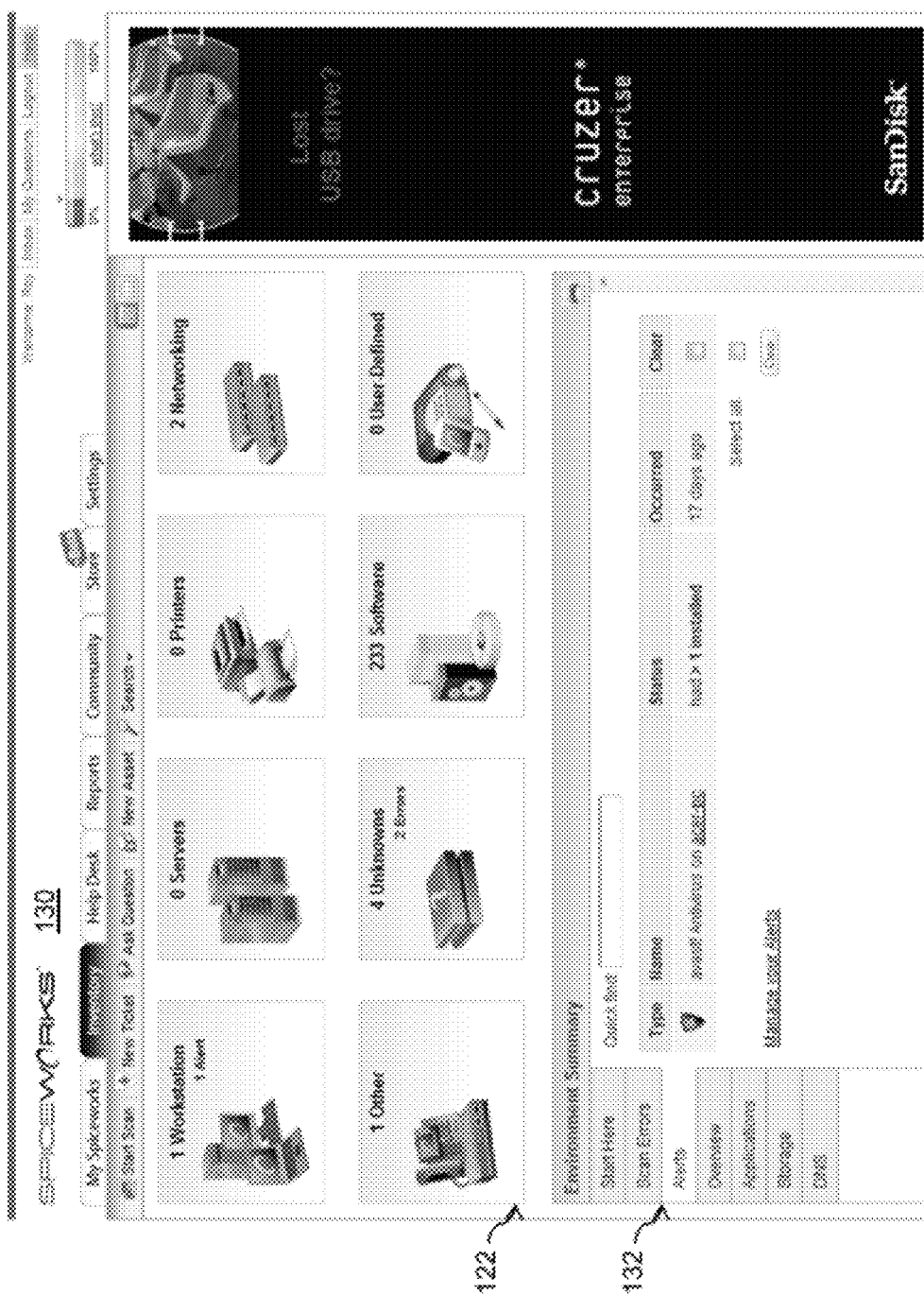

FIG. 2 shows a view 130 of Alerts tab 132 on the bottom half 122 of the screen. The Alerts tab 132 allows a user to see, at a glance, different alerts that have been fired for the entire network. In one embodiment, default alerts may include whether a machine is offline, is running out of disk space, or if anti-virus software is not up to date.

Figure 3:

FIG. 3 shows a view 140 of Storage tab 142 on the bottom half 122 of the screen. The Storage tab 142 allows a user to see all assets in the environment and how much hard disk space remains. A user may view that an asset is running out of disk space and proactively try to manage the issue before it becomes a problem.

Figure 4:
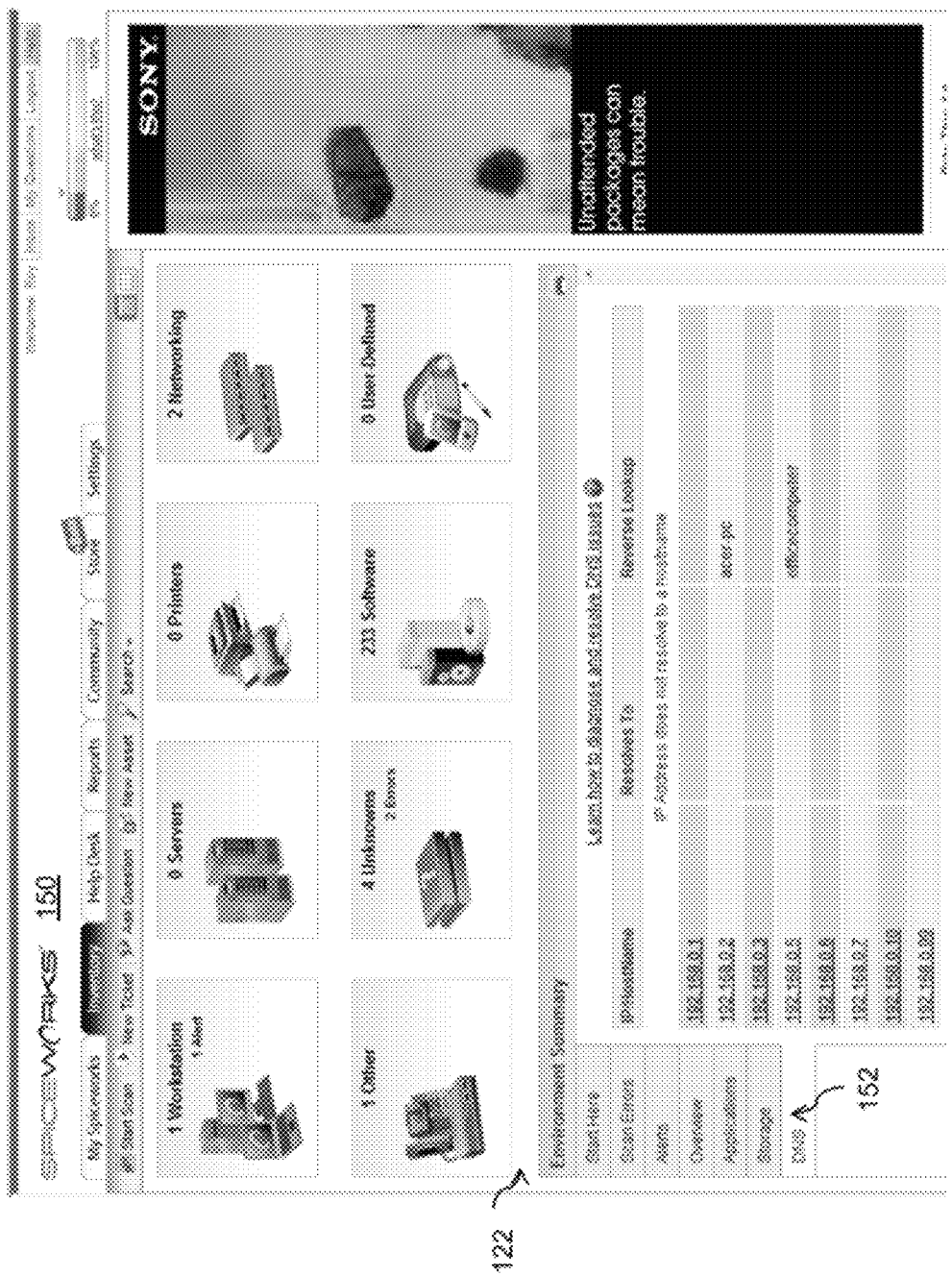

FIG. 4 shows a view 150 of DNS tab 152 on the bottom half 122 of the screen. The software will attempt to query a DNS server and make sure that it is configured correctly.

Figure 5:
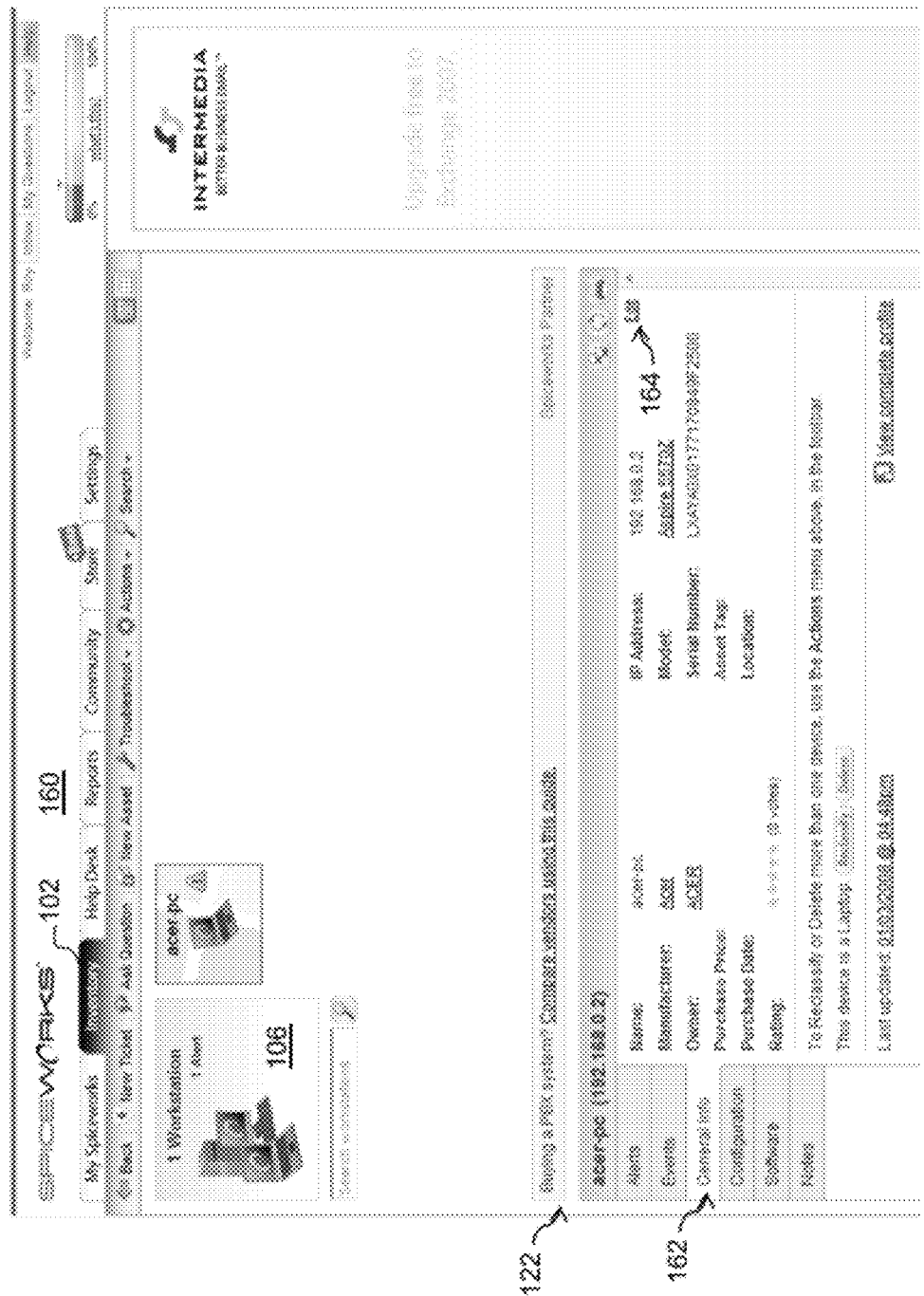

FIG. 5 shows a view 160 of one embodiment of the data a user may view related to a workstation upon clicking the Workstations 106 category under the inventory tab 102. In the embodiment shown, the General Info tab 162 at the bottom half 122 of the screen shows information collected by the software related to a workstation. Such information may include manufacturer, model, serial number and other information about the workstation. A user may manually enter information about the workstation by clicking the Edit tab 164. In the embodiment shown, such information may include purchase price, purchase date, asset tag and location.

Figure 6:
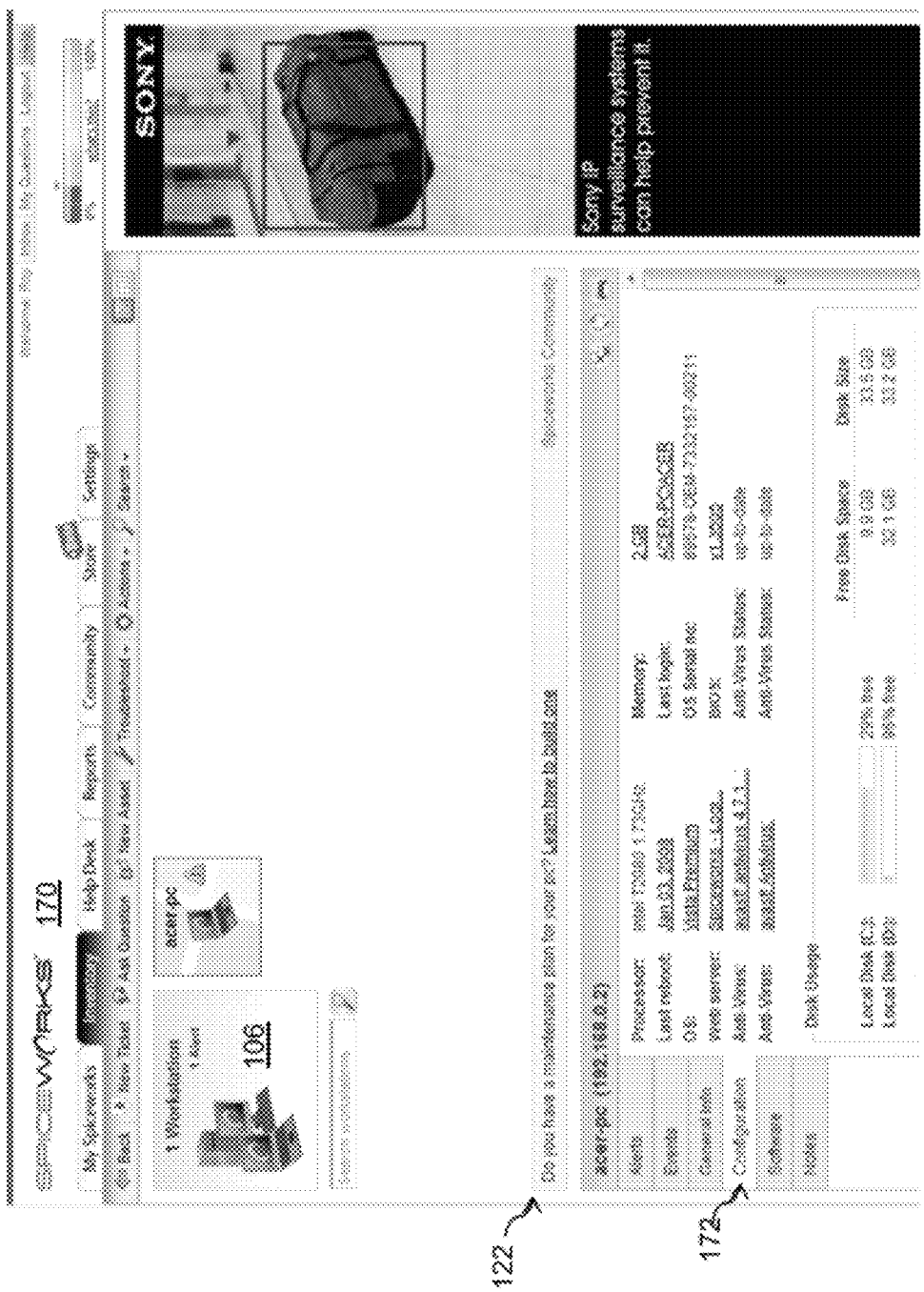

FIG. 6 shows a view 170 of Configuration tab 172 at the bottom half 122 of the screen. In the embodiment shown, reboot information, amount of memory, last login, BIOS among other information.

Figure 7:
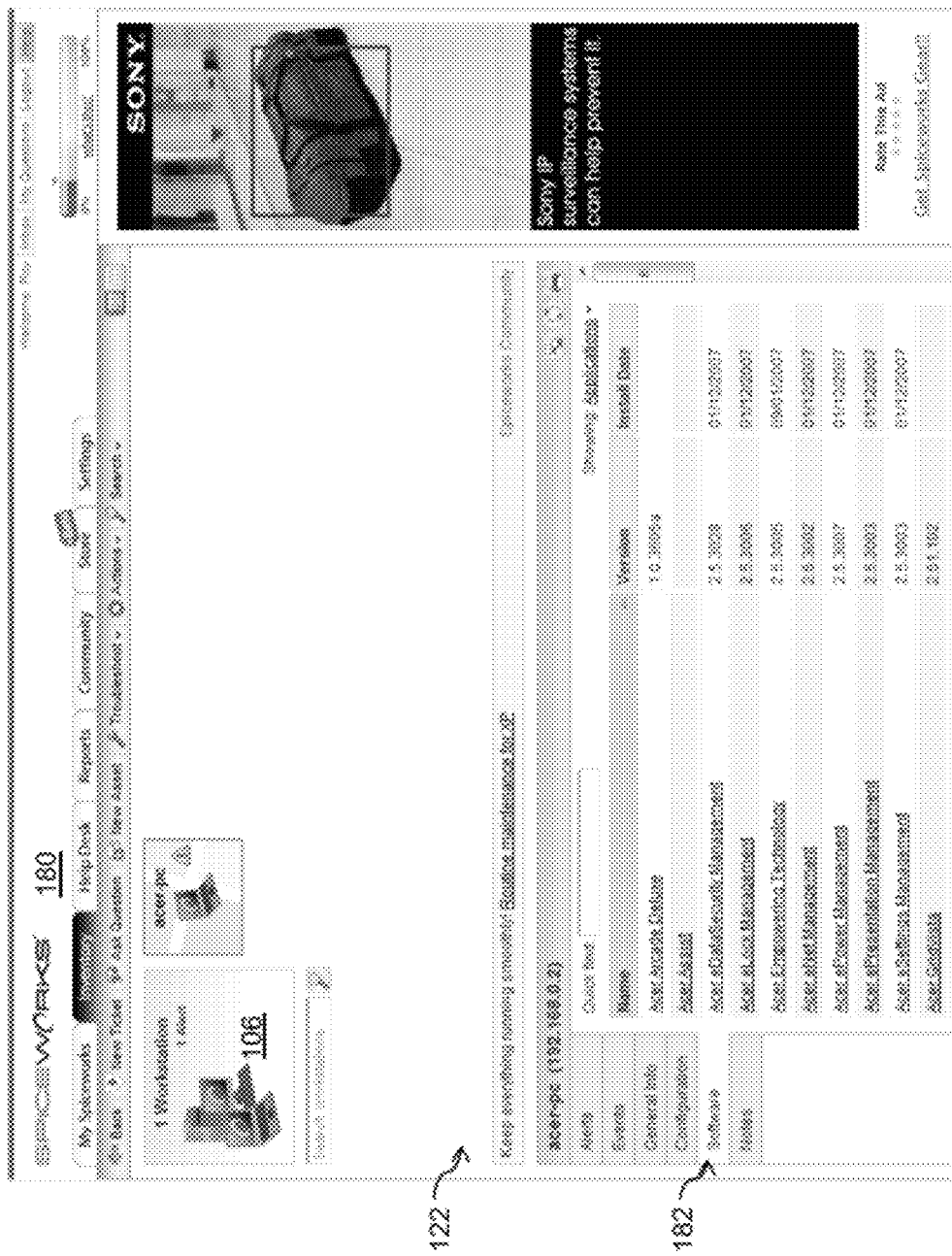

FIG. 7 shows a view 180 of Software tab 182 at the bottom half 122 of the screen. In the embodiment shown, all of the software installed on the device, what the version number, and when it was installed.

Figure 8:
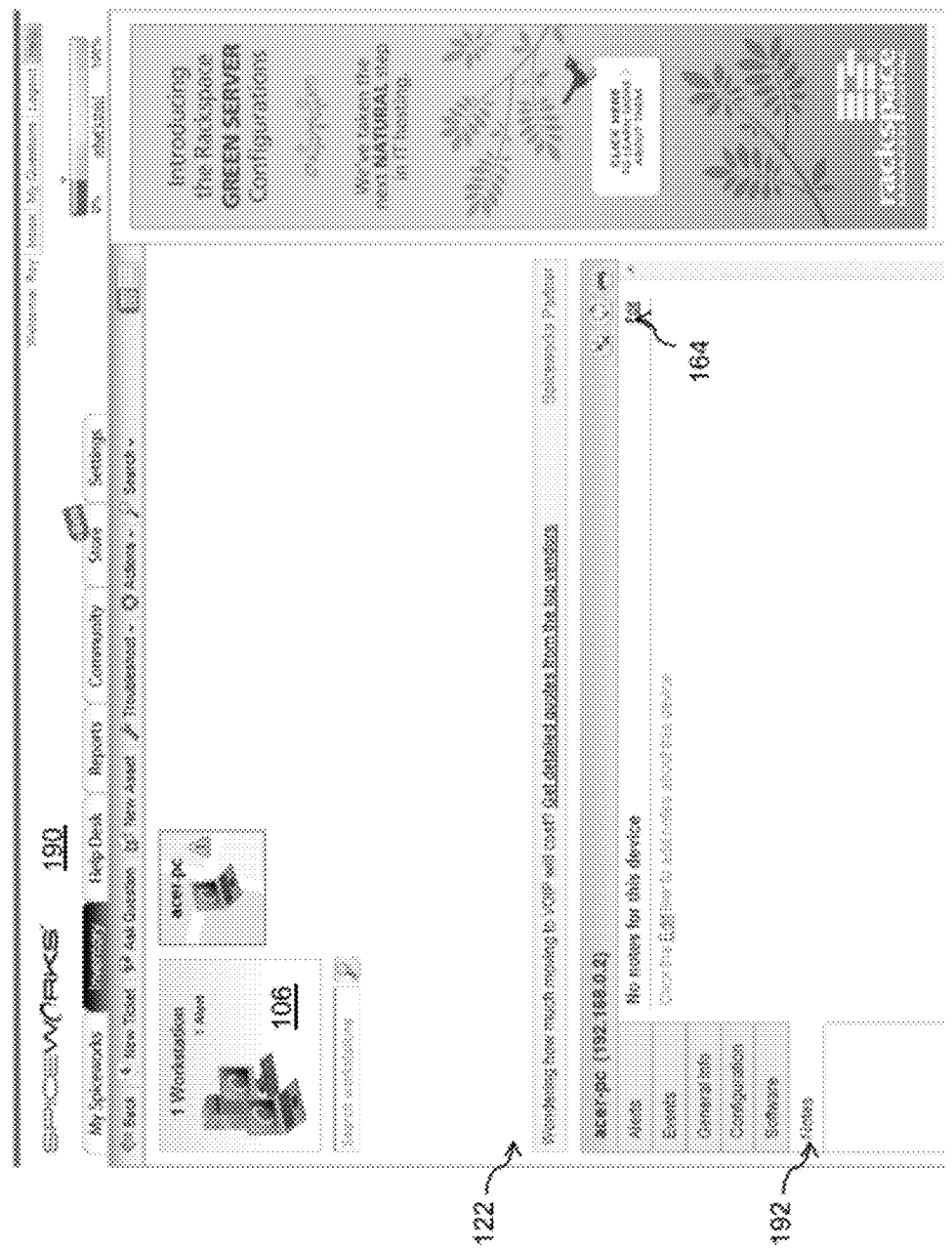

FIG. 8 shows a view 190 of Notes tab 192 at the bottom half 122 of the screen. In the embodiment shown, a user may enter notes about a workstation using Edit tab 164. For example, a user may want to make a note of problem issues associated with that workstation.

Figure 9:
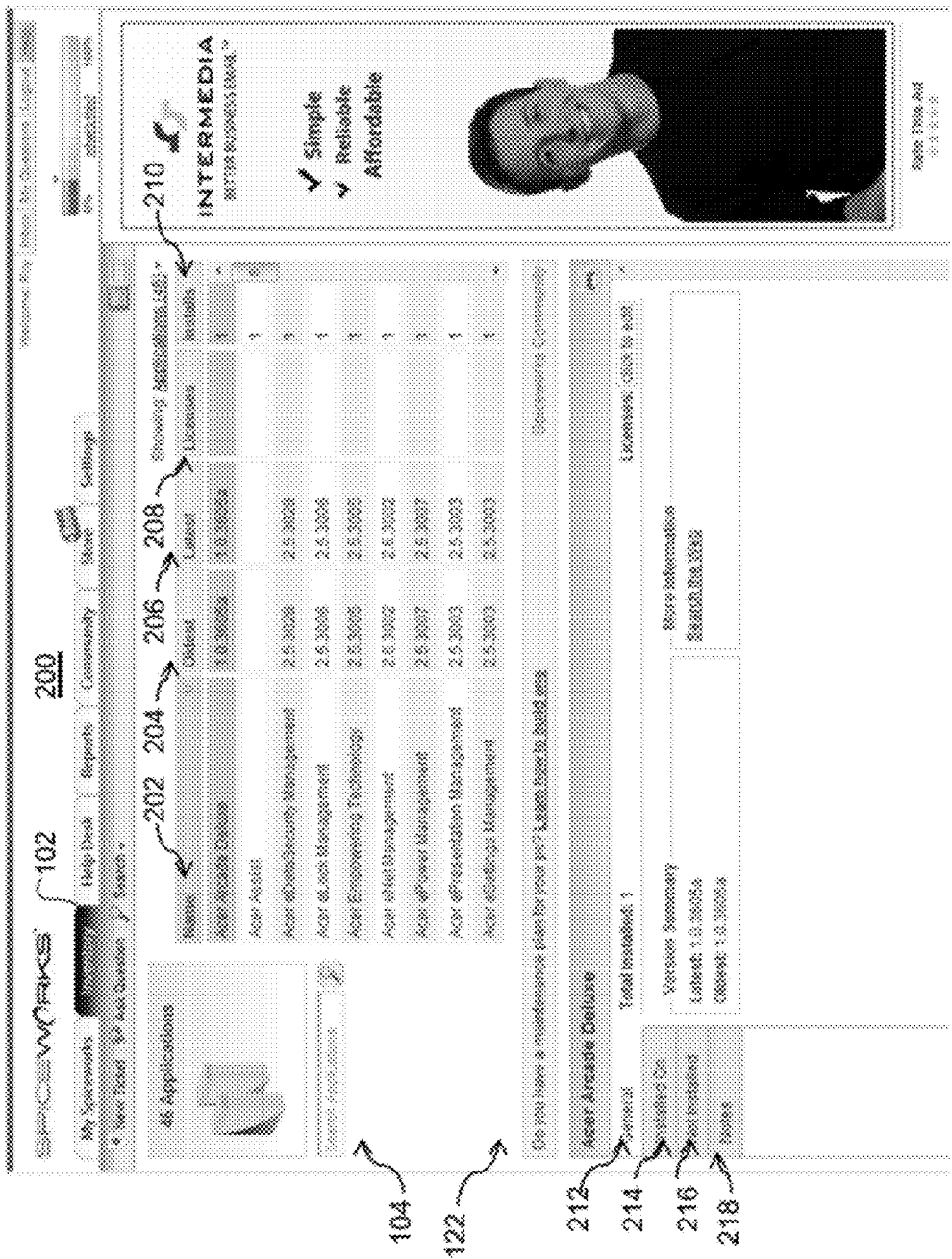

FIG. 9 shows a view 200 of one embodiment of the data a user may view related to a workstation upon clicking the Software 118 category under the inventory tab 102. In the embodiment shown, the name 202 of the software, the oldest version 204 of the software on the network, the latest version 206 of the software on the network, the licenses 208 and number of installs 210 are displayed.

On the bottom half 122 of the screen, the General tab 212, Installed On tab 214, Not Installed tab 216, and Notes tab 218 are useful in managing licenses. For license compliance, a user may input the number of licenses available for a given software package. In the event that the number of installed versions of software exceeds the number of available licenses, an alert may be issued, indicating that the threshold for license compliance has been crossed. This may be a very powerful tool for a user to take to management to request purchases of additional required licenses. In addition, it may be useful for a user to be able to ensure that for a volume license, the same key is being used for each instance of installed software.

Figure 10:
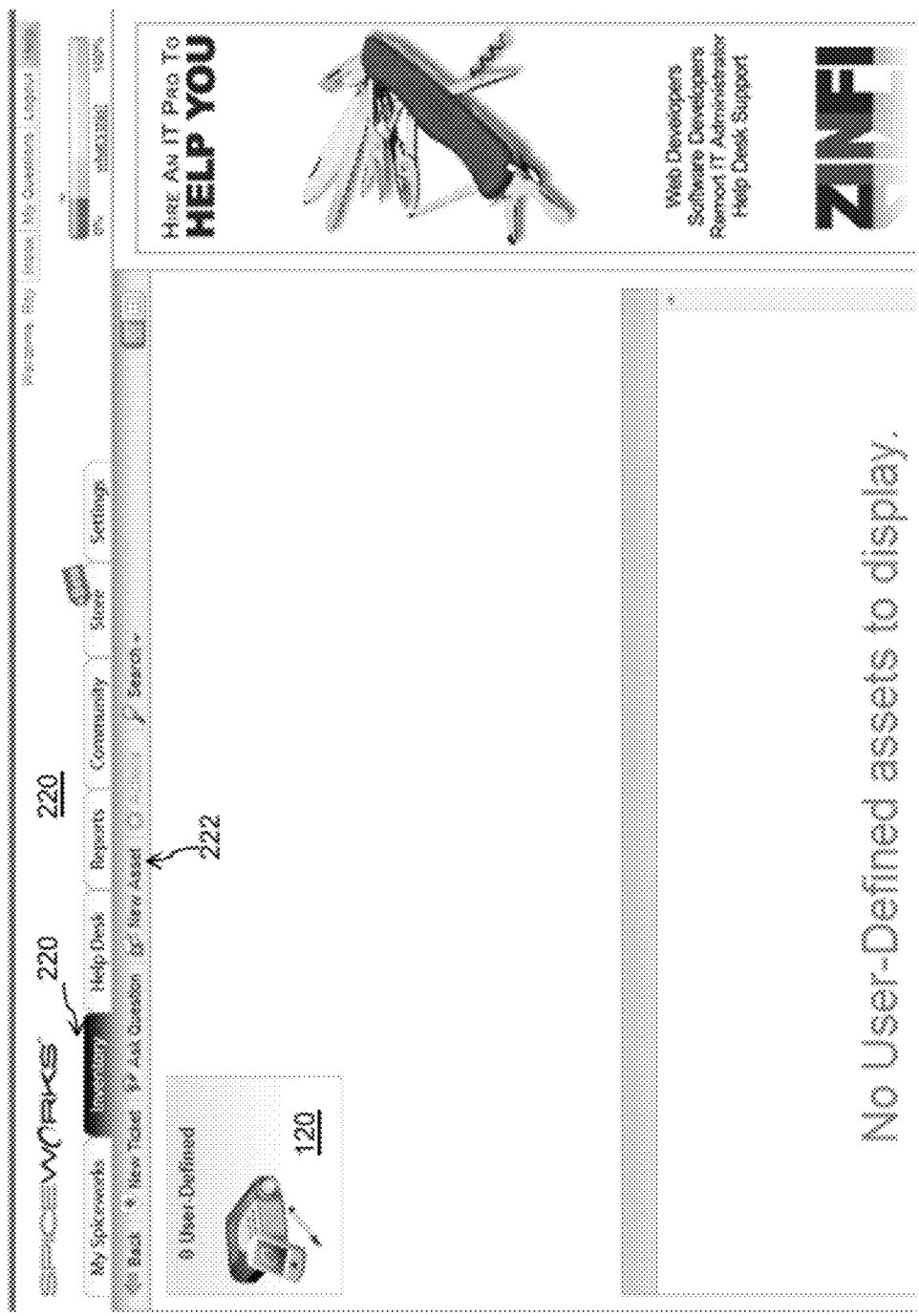
Figure 11:
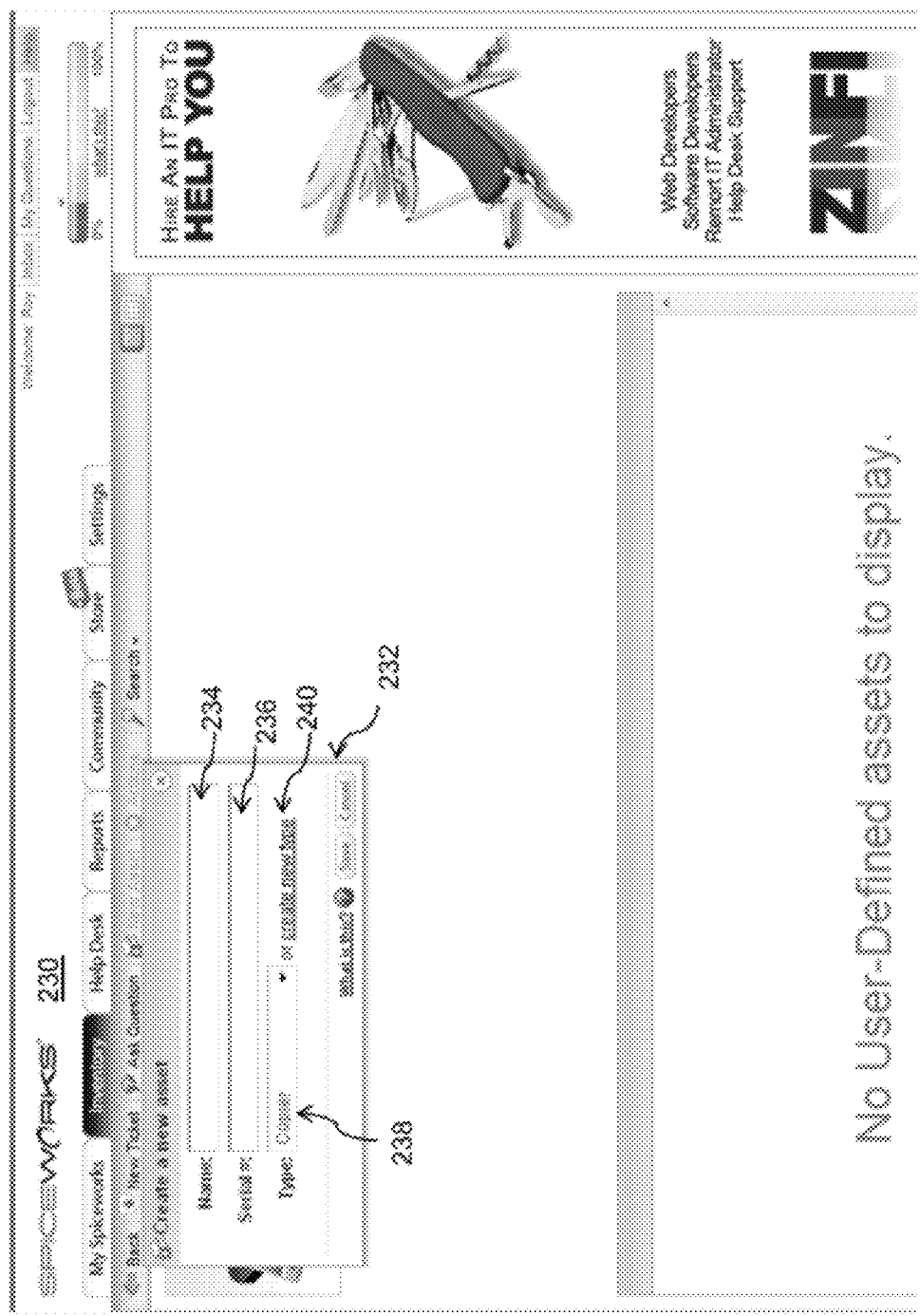

An IT administrator may also need to manage things that are not easily detectable on a network. In that case, there is a 'User Defined' category. FIG. 10 shows a view 220 of one embodiment of the data a user may view related to a workstation upon clicking the User-Defined tab 120 category under the inventory tab 102. For example, in order to track a new projector (not easily detectable on a network), a user may click the 'New Asset' tab 222. FIG. 11 shows a view 230 of one embodiment of a user pop-up 232 for entering information related to a new asset. For example, a user may enter Name 234 and Serial Number 236 as well as select a Type 238 from pre-defined categories. In one embodiment, the pre-defined categories in the Type 238 pulldown include Copier, desktop, Fax, Hub, Laptop, Printer, Router, Server, SnmpDevice, Switch, VoIPDevice and Wireless Access Point. Alternatively, a user may create a new type 240 by manually defining a category.

The disclosed subject matter also provides for an information technology (IT) help desk. Daily projects and user requests may be managed from one interface. A ticket may be created upon discovery of a network asset that requires attention while browsing a network. Clients may submit tickets with attachments via email or the Web and may then view the status of those tickets online. Tickets may be assigned across an IT team or attached to hardware on the network. Reports may be run on the tickets to easily view due dates and which assets (or even departments) cause the most issues.

An internal help desk may greatly reduce the amount of time spent tracking work and responding to users and also makes it easy to report on the amount of time spent doing IT related activities. In one embodiment, the presently disclosed software is pre-configured with several of the most commonly used help desk options.

Figure 12:
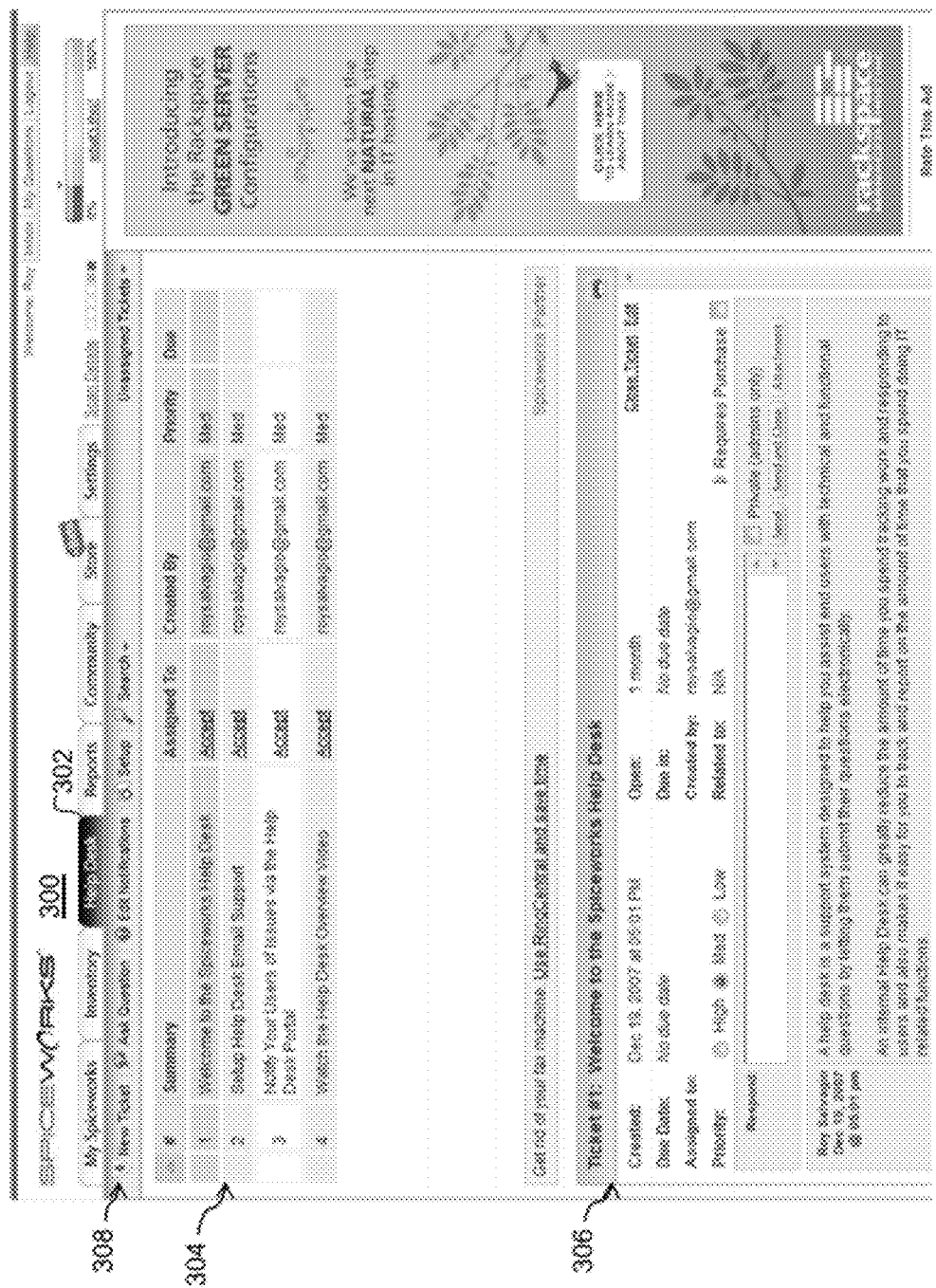
FIGS. 12 and 13 show views of the help desk tab of one embodiment of the disclosed subject matter.

FIG. 12 shows a view 300 of an embodiment of a help desk tab 302 of the present disclosure. As shown, the help desk is divided into two regions. The top half of the screen 304 shows current help requests while the bottom half of the screen 306 shows the details of a particular help request. In one embodiment, there are several ways to create a help request.

Figure 13:
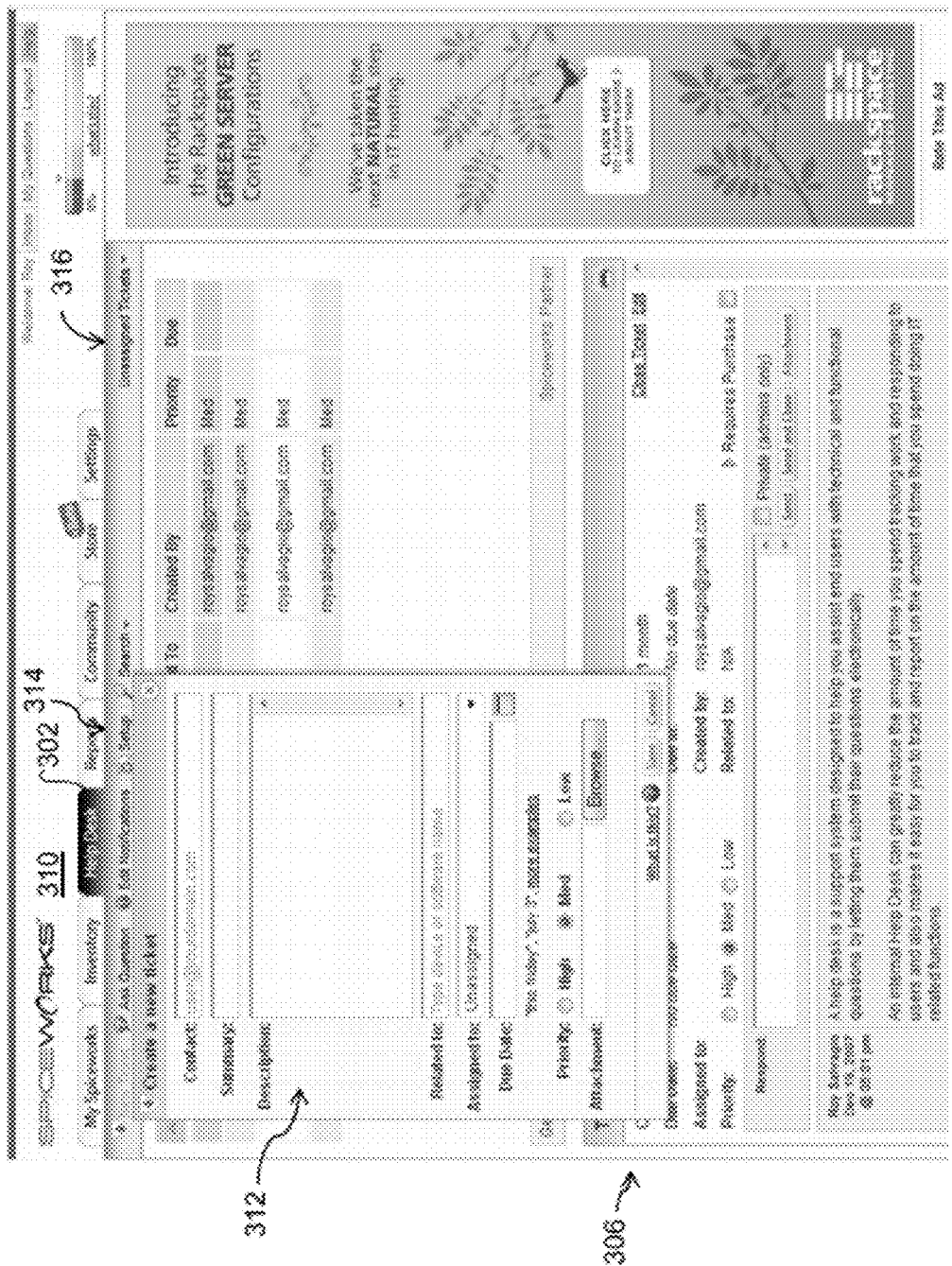

An administrator may create a help request within the presently disclosed software using the New Ticket tab 308. FIG. 13 shows a view 310 of a form for creating a new ticket 312 that appears when an administrator clicks on the New Ticket tab 308. In the embodiment shown, the form 312 includes Contact, Summary, Description, Related To, Assigned To, Due Date and Priority input fields. The form 312 also allows for the attachment of files using the Browse button. Alternatively, users may submit help desk requests by directly using the web interface (not shown) of the presently disclosed subject matter. This is available to anyone with a web browser, making it easy to submit a request, check on the status of a request, as well as reply. Alternatively, the help desk may automatically create help desk requests by allowing a user to send an email. This may be done by clicking the Setup tab 314.

In one embodiment, help desk tab 302 allows an administrator to select the tickets to be viewed 316 as unassigned tickets, open tickets, closed tickets, past due tickets, all tickets, tickets assigned to that administrator, and tickets where a purchase is required. Further, an administrator may make changes to a help desk request and correspond with a user using the features available on the bottom half of the screen 306.

The disclosed subject matter provides for reports for sharing IT information. Reports may include software installed on machines, disk usage across the network, trouble tickets recently created, among others. Further, custom reports may be created using a simple interface. Reports may be published or exported to PDF or Excel. Useful custom reports may be shared with other users.

Figure 14:
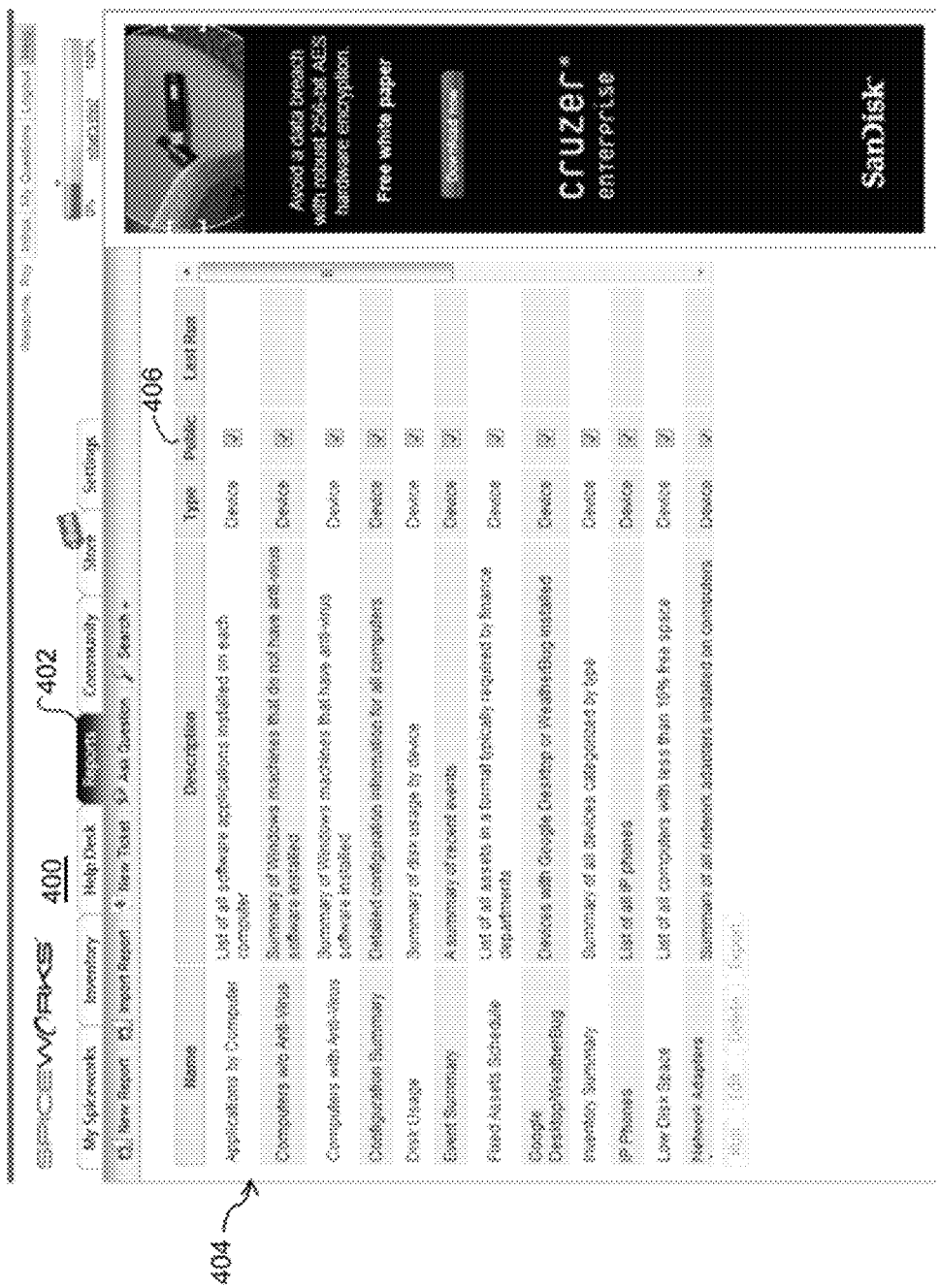
FIG. 14 through 16 show views of the reports tab of one embodiment of the disclosed subject matter.

FIG. 14 shows a view 400 of an embodiment of a reports tab 402 of the present disclosure. In one embodiment, default reports 404 include Applications by Computer, Computers without Anti-Virus, Computers with Anti-Virus, Configuration Summary, Disk Usage, event Summary, Fixed Assets Schedule, Google desktop/WeatherBug, inventory Summary, IP Phones, Low Disk Space, Network Adapters Summary, Printers and Copiers, Server event Summary, Services on Computers, Tickets by Device, Installed Applications, Software Compliance, Tickets by Software, All Tickets, Closed Tickets, Open Tickets, Reopened Tickets and Tickets Pending Purchase.

Note that the Public column 406 may be used to mark a report as available to other users. For example, a supervisor or accounting personnel may need to view reports regularly. Making a report public allows such a user to view the report from within the software of the disclosed subject matter.

Figure 15:
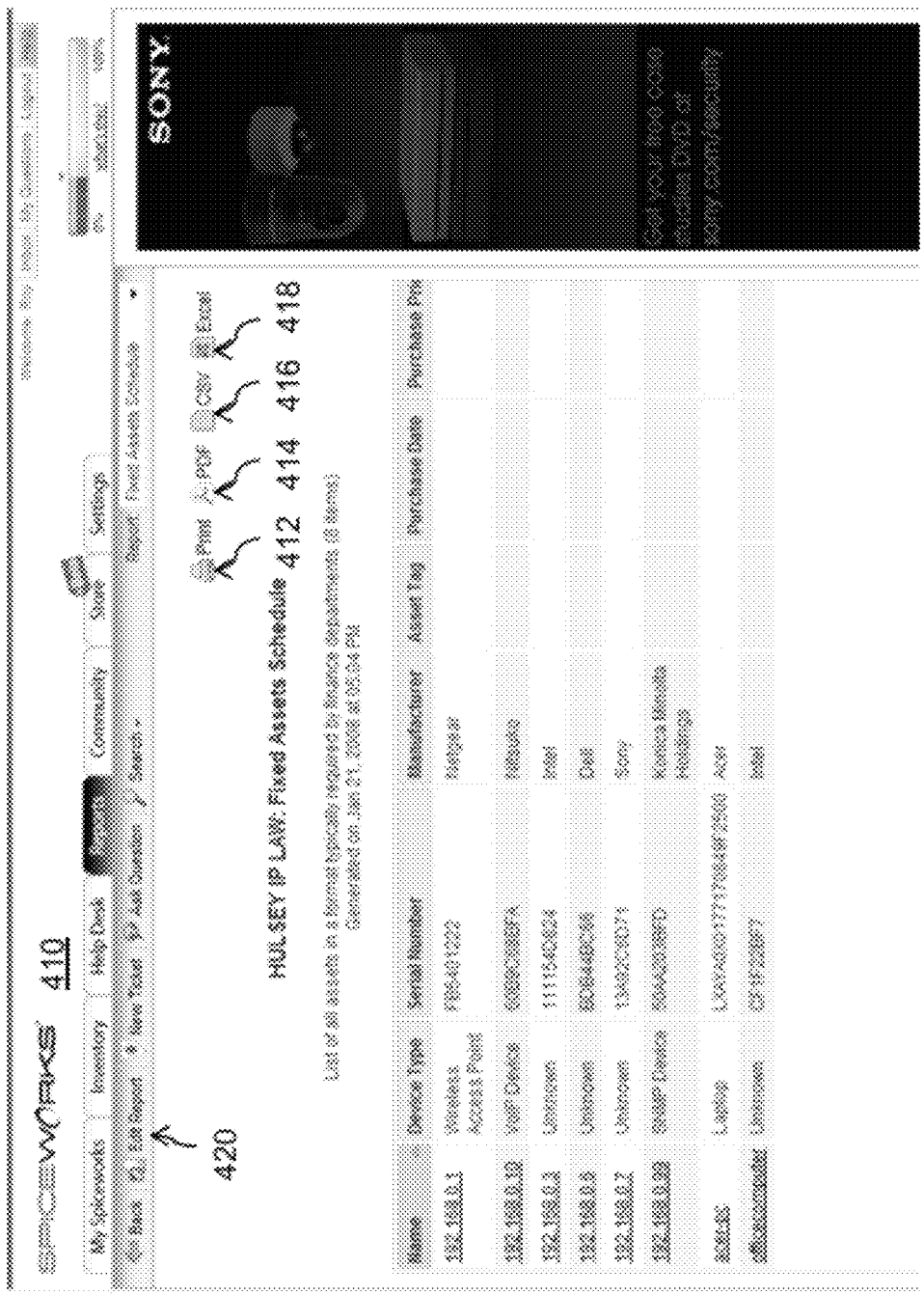

FIG. 15 shows a view 410 of one embodiment of a default report, a Fixed Assets Schedule. A user has the options to Print 412, export to PDF 414, Export as CSV file 416, or export to Excel 418. Further, a user may edit a report by clicking the Edit Report tab 420.

Figure 16:
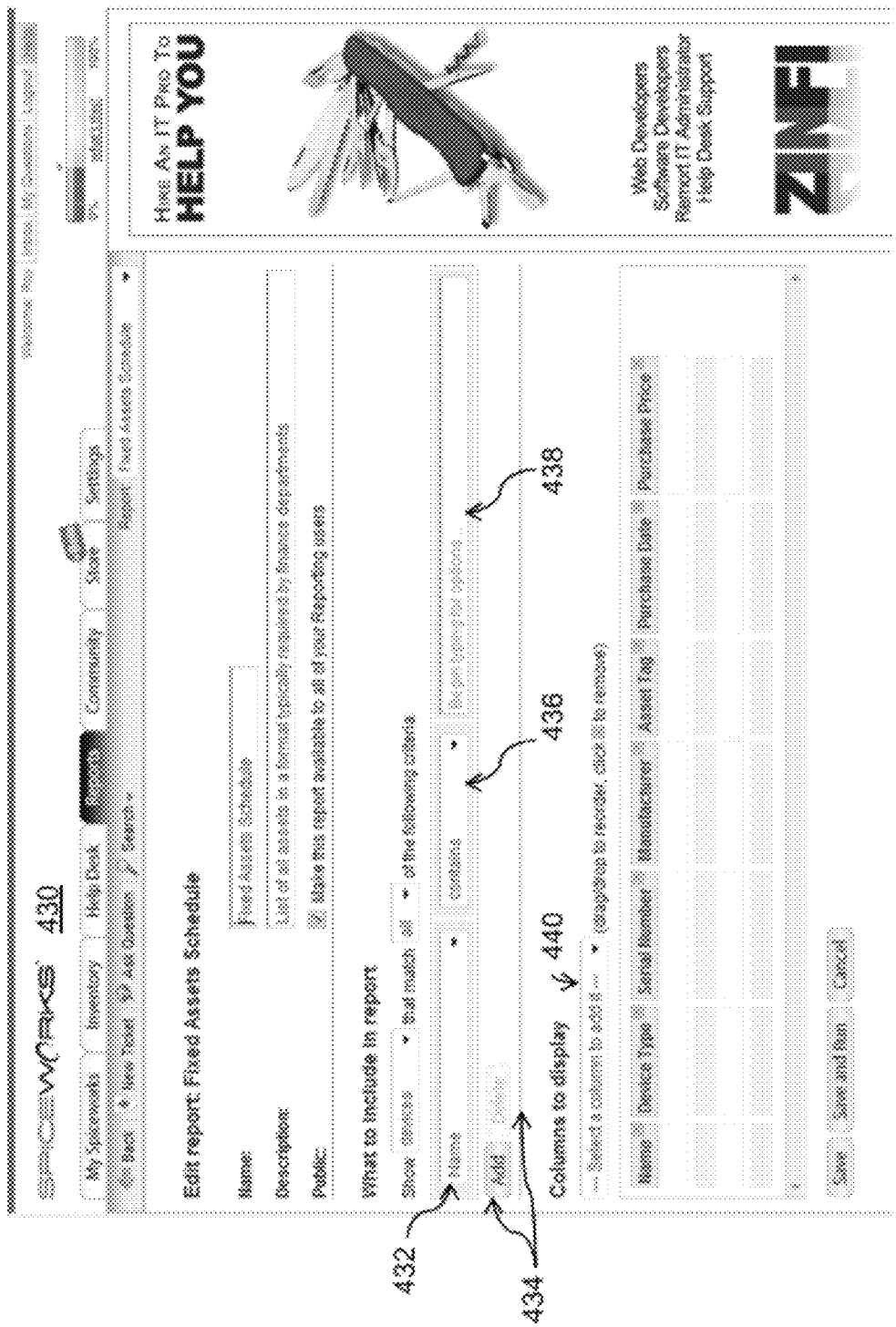

FIG. 16 shows a view 430 of one embodiment of the options available for editing a report. The Name dropdown 432 displays a list of available items to be included in the report. Add and Delete buttons 434 enable a user to add or delete items in the report. In one embodiment, criteria dropdown 436 may include such operators as is, is not, contains, does not contain, begins with, and ends with. Text input field 438 allows a user to manually input data. A user may select the columns for display in the report using the Columns to display dropdown 440.

The disclosed subject matter may also be used to monitor a network for trouble. A user may view, and set up alerts for, Windows events that occur across the environment for easily detecting, diagnosing and troubleshooting issues that disrupt a network. Further, the disclosed subject matter allows for automatic identification of PCs and servers with low disk space, the presence of unwanted software on the network, the status of anti-virus updates, printers with low toner and ink levels, and offline servers. Email alerts may be used for notification of potential issues. Further, valuable monitors are all consolidated in one centralized location.

Figure 17:
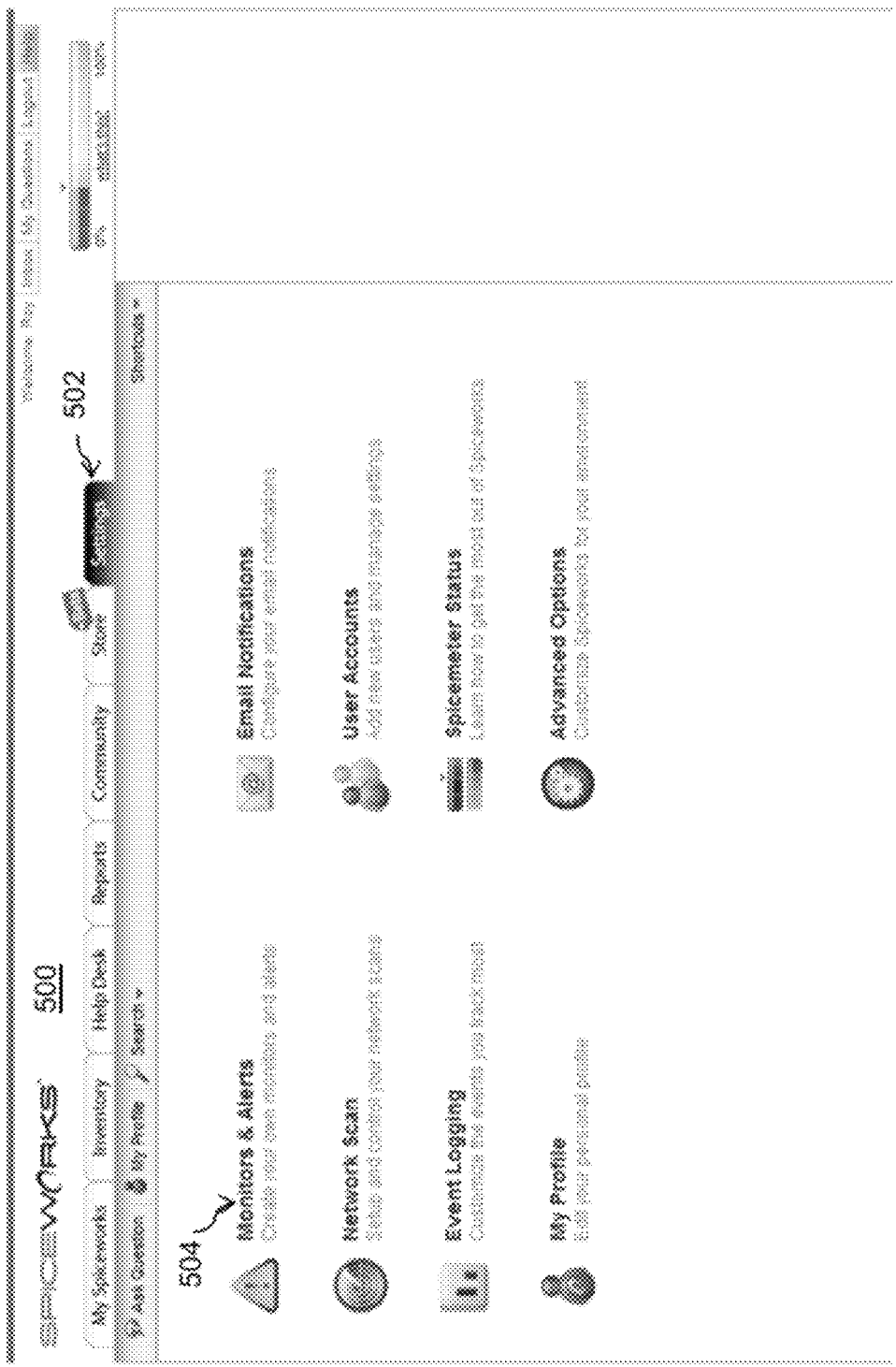
FIGS. 17 and 18 show views of the settings tab of one embodiment of the disclosed subject matter.
Figure 18:
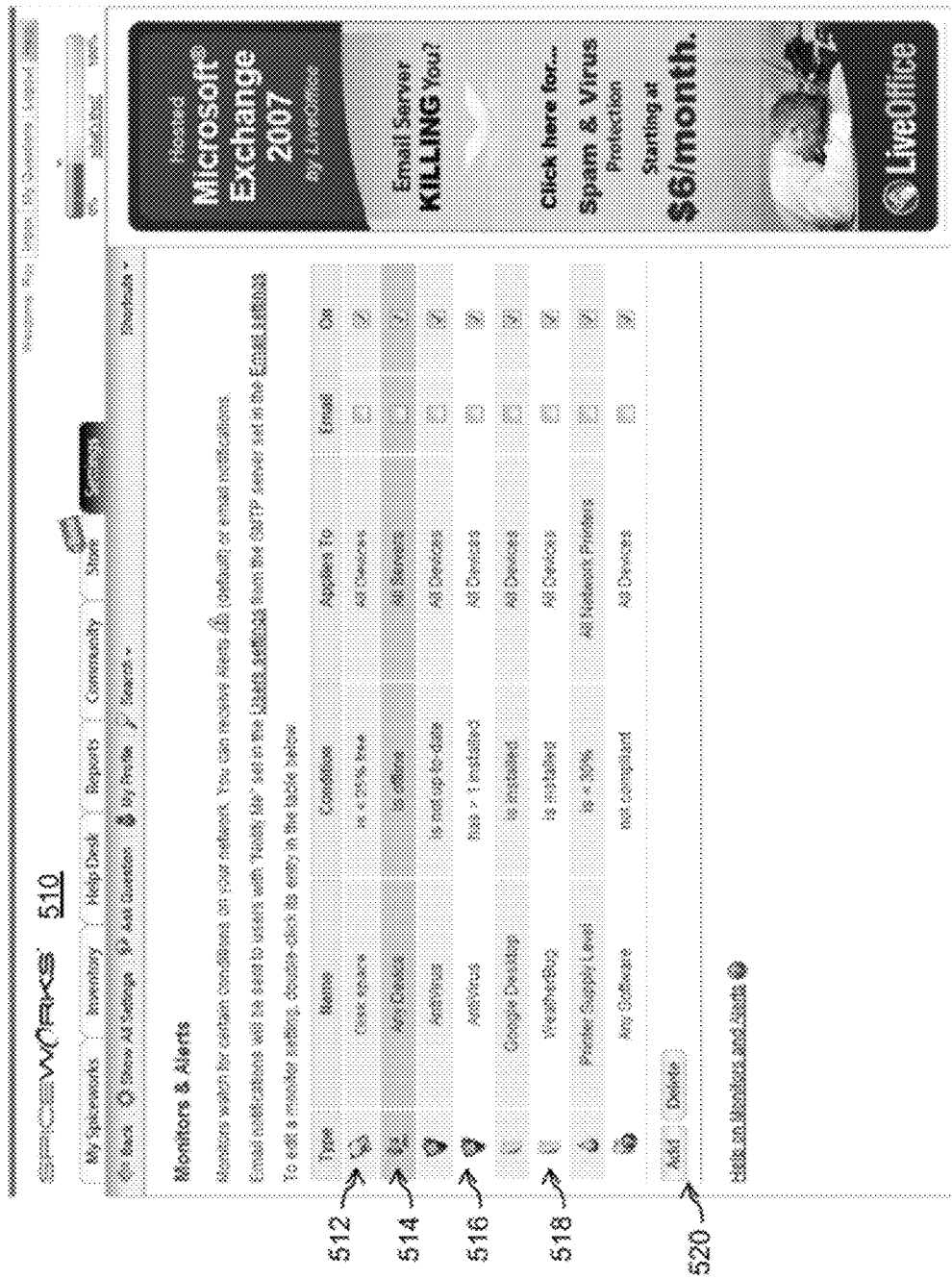

FIG. 17 shows a view 500 of an embodiment of settings tab 502 of the present disclosure, including a link to Monitors and Alerts 504, shown in view 510 of FIG. 18.

A monitor is any condition which can be automatically evaluated by the software of the present disclosure. In one embodiment, the default monitors include Disk Space 512 (amount of free disk space), Online/Offline Status 514 (online/offline status for a device or group of devices), Anti-Virus 516 (when anti-virus software is present and up to date), and Troublesome Software 518 (when specified software is removed or installed, including Google desktop and WeatherBug).

To add a new monitor, a user may click 'Add' 520. For example, an administrator may want to monitor when a new version of Microsoft Office Outlook is installed or uninstalled. This will result in an alert being fired in the event that Microsoft Outlook is installed or uninstalled. This is a powerful way of monitoring an environment without the need for manually checking each system in the environment.

The disclosed subject matter allows the user to report on the network. The software allows the user to see software installed on machines, disk usage, and trouble tickets. Custom reports can be created and published so that others in the network can be informed of network updates, and issues. Reports may then be exported in file formats such as PDF and Excel. Finally, the user can share and receive report templates from other users of the software.

The disclosed subject matter allows a user to troubleshoot issues on the network. When problems arise, the software allows for identification of cause and resolution of the problem. For example, a user may see what software is running on a machine causing it to run slowly. A remote control tool may be launched from within the software. Two machines may be compared to determine what settings are different. The software allows for pinging a machine to see if it is online, waking up a computer with a wake on LAN request, or running a traceroute to identify the flow of data. Further, the software allows a user to identify when a server is running out of capacity.

A user may troubleshoot a workstation with an issue by comparing that workstation with another workstation that is working correctly. The Compare tab allows a side by side comparison of a first machine versus a second machine. The software highlights in red any difference found in hardware, configuration, software, services or hotfixes. A user may also perform remote administration of machines via the Remote Control tab. The software uses two methods of remote control including Microsoft's Remote desktop protocol and VNC screen-sharing protocol, but other remote control methods are configurable.

Figure 19:
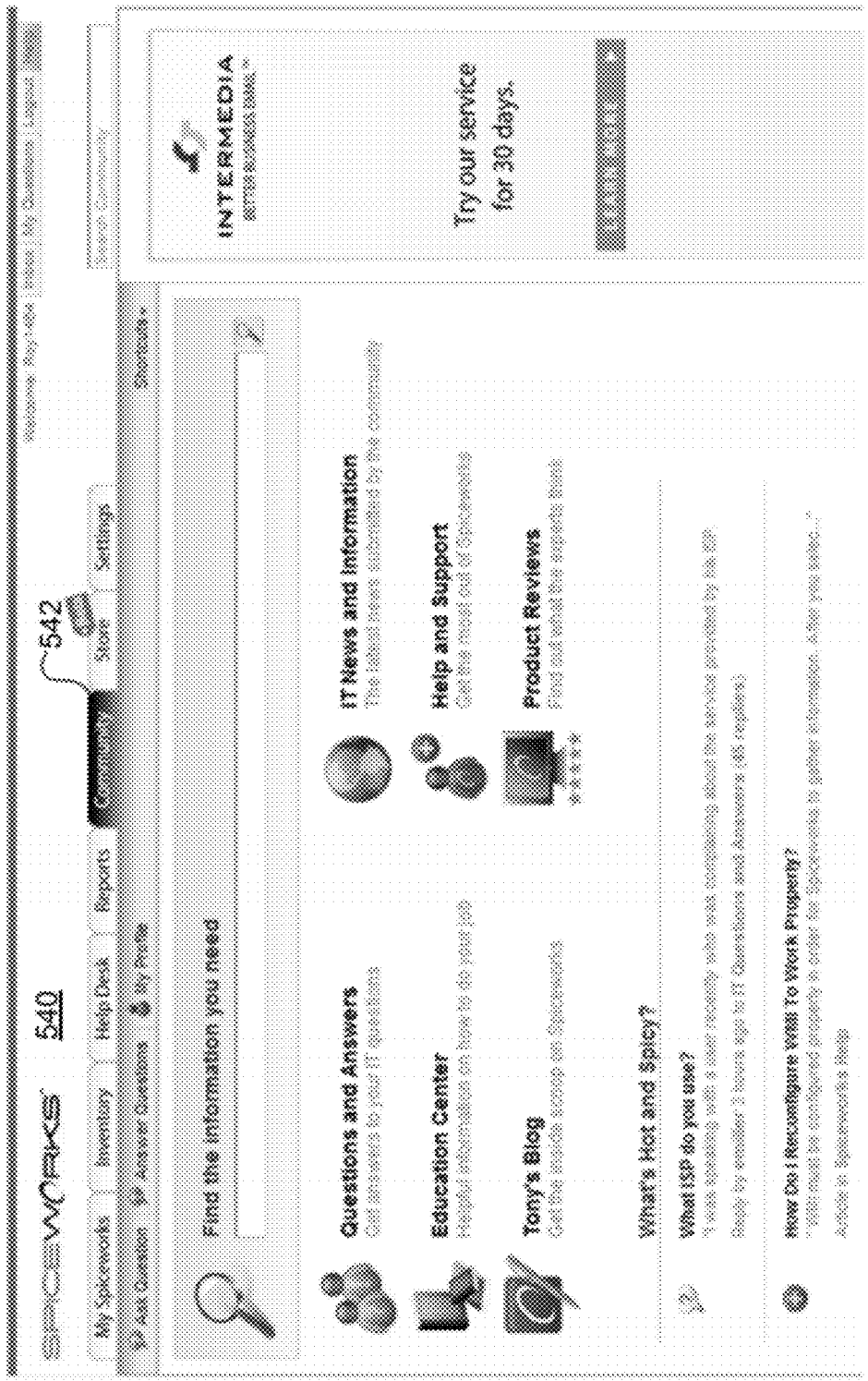
FIG. 19 shows a view of the community tab of one embodiment of the disclosed subject matter.

FIG. 19 shows a view 540 of an embodiment of community tab 542 of the present disclosure. The disclosed subject matter allows a user to collaborate with other IT professionals. For example, a user may receive ratings and recommendations, ask questions, get tips and support, or join discussions. The collaboration may allow a user to help author IT Wikipedia articles, all with an audience that is familiar with small and medium sized business IT issues. Further, a user may submit useful online IT news and information.

The disclosed subject matter allows a user to become a virtual extension of the software development team. A user may request and vote on new features, view other users' ratings of features, submit feedback on existing features, and preview upcoming releases.

Figure 20:
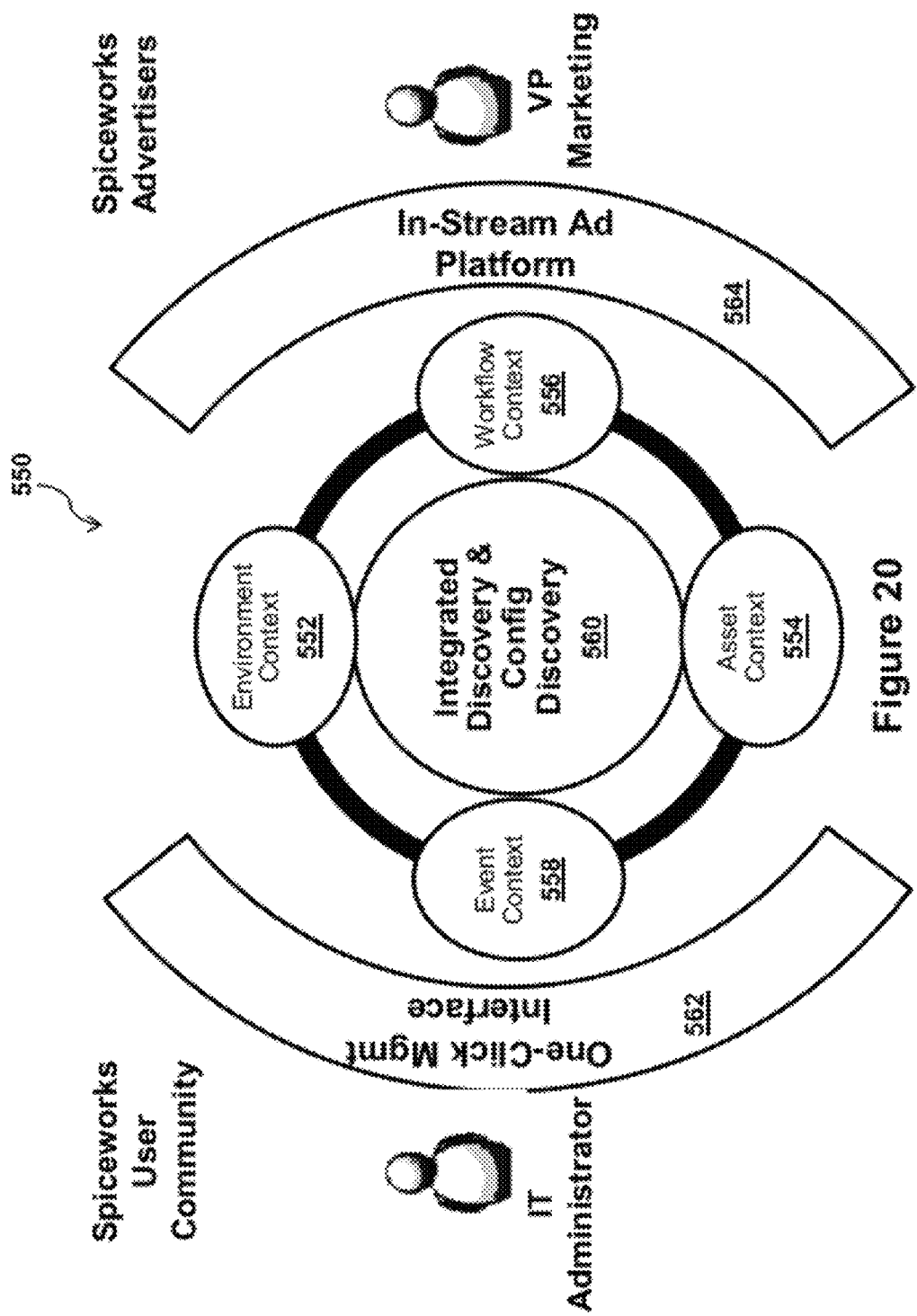
FIG. 20 shows a high level schematic architecture of the disclosed subject matter.

FIG. 20 shows a high-level architectural view 550 of one embodiment of the disclosed subject matter. The different contexts supporting the disclosed subject matter include an environment context 552, an asset context 554, a workflow context 556, and an event context 558. These contexts make up the integrated asset and configuration discovery 560 of the disclosed subject matter. All of the information is available to an IT administrator or other user via a one-click management interface 562, along with in-stream advertising platform 564.

The asset context engine 554 allows a user to view the network assets on an individual, group or global basis and generate reports, flags and alerts.

The event context engine 558 provides a user with insight into the history of events related to the system, such as recent issues flagged by the operating system or IT staff, actions taken by the IT staff on the system and similar operations applied to like systems in the environment.

The workflow context engine 556 is a smart engine providing the user with information based on the processes that user is currently running. The workflow context engine 556 analyzes the current work by the user and presents this data through the data pivoting interface. For instance, if an end of year inventory program is running, the workflow content engine 556 may direct the user to websites where identified or needed computer or network hardware, software or peripherals and be researched and purchased. Additionally the workflow content engine 556 may simply drive advertisements to the user relating to the user's perceived needs. The data pivoting will be further discussed later in the disclosure.

The disclosed subject matter include a data pivoting or fast-find function for providing an ability to pivot on data. Data pivoting provides the function of finding more data of a particular type or, alternatively, selecting against a particular type of data—i.e., data not like a particular type of data. This is an easily accessible feature from anywhere in the disclosed system and can act/operate on virtually any node in the system. The system makes sure that it knows where the process flow is in a process tree and where a user is likely to try to go next in using the system. This addresses the problem of having an unmanageably long list of options from which to pick based on a cumbersome list of options. In other words, the system provides the ability to discern the meaning and relevance of different data.

A particularly novel aspect of the present disclosure includes with discerning the user view upon the occurrence of a data pivot. This depends on where the user is in the system when a data pivot occurs. If the user is in a tree or limb node of the system, then the user should probably go to a similar view. In such a view, however, the new filtered data will be presented. That is, the same types of things will be presented—just more or less of them. If, on the other hand, the user is on a leaf node, then most likely, they may pop-up a level to a view with more nodes in it. Such a view will assume the result of the pivot provides more elements than one. If the system returns only one element back from the pivot, then the system will provide the user with the same view presently shown, in a leaf or detailed view. The main difference in such an instance is that in one model, the use will "hop" back up the tree. In the other model, the user will move to another leaf node in the system.

Additionally, the disclosed system presents these options to the user in beneficial ways. In some cases the system may need to know that the use desires to view computers with or without X. In other cases, the user may desire to know which computers have different software packages or patches on X. The notion of an advanced version of the pivot enhances the "Browse" view to effectively allow a user to browse around a networked system hierarchy in any direction. A further embodiment provides the user with the advanced choice of entering a browse mode with navigational functions already completed, according to from where in the data hierarchy the system operation occurs.

Elements that are pivotable may be anywhere in the system and may include a simple easy-to-understand way of identifying the elements as "special," thereby inviting the user to move their computer screen cursor over to the pivotable element. Once there (e.g., via movement of a mouse) a flyover application may yield a small popup with more details about the pivotable element.

If a pivot is available, the system displays this feature, e.g., by underlining the element. The user may then know that clicking on the element is possible. Once clicked, a small choice list is dropped down. Alternatively, the system may use a small triangle or other symbol (pointing down) to indicate this function. Special pieces of data may be highlighted (e.g., by color) so that folks know that there is something special to do there.

A fly over or hovering over the pivotable item causes a popup menu to appear. The popup menu provides more relevant details about the particular item. There may be many ways to determine associated functions and features using the presently disclosed data pivoting function. As such, the presently claimed invention would include within the scopes of the claims here appending contemplation of such variations.

Figure 21:
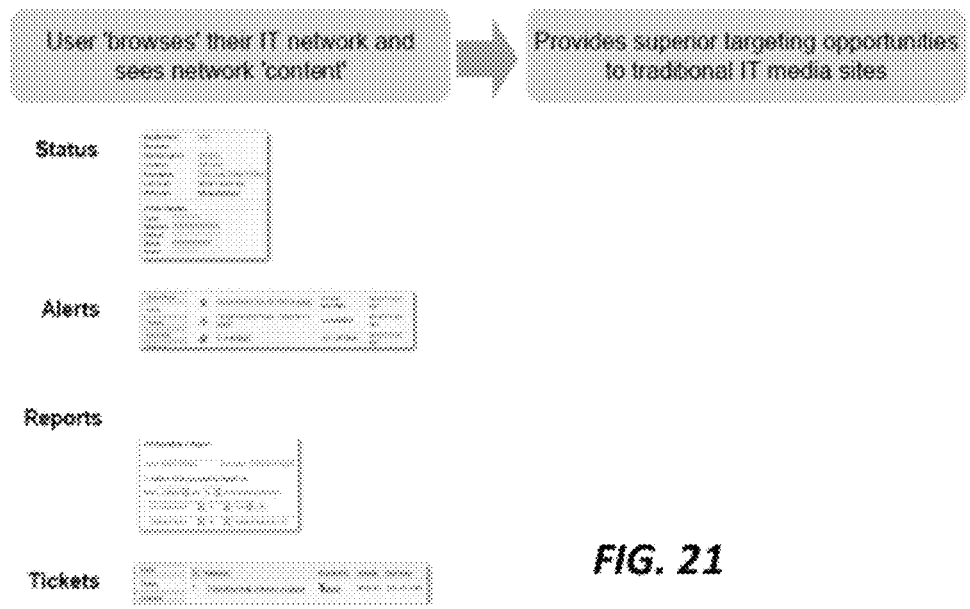
FIG. 21 shows how the presently disclosed network management system allows an IT administrator to browse an IT network and see network content, while IT equipment and software vendors obtain targeting opportunities for potential purchasers.

FIG. 21 shows how the disclosed subject matter allows an IT administrator to browse a network for network content, while IT equipment and software vendors obtain targeting opportunities for potential purchasers. The integrated asset and configuration and discovery software module, subroutine or engine 562 scans the network and provides information relating to the system and its components, such as type of computer, operating system, and other information. Additionally, the present system provides the user with system status (such as low ink); the system then alerts the user, reports on the problem (such as number of licenses; finally, a work order or purchase order tickets may be created and assigned.

Figure 22:
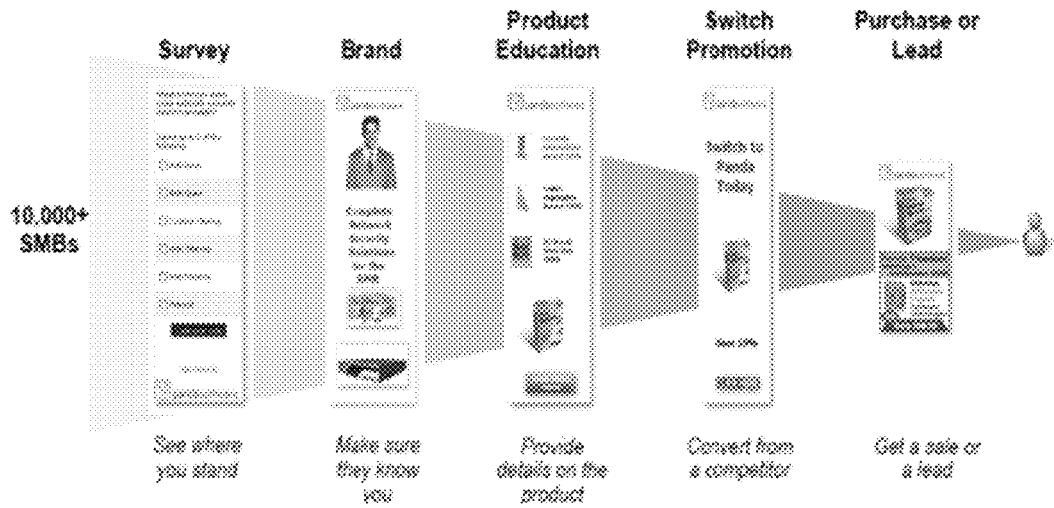
FIG. 22 depicts how the process of the present disclosure promotes purchase opportunities for buyers and sellers in an IT network environment.

FIG. 22 depicts how the process of the present disclosure promotes purchase opportunities for buyers and sellers in an IT network environment. For the advertiser/vendor community, the disclosed subject matter provides an in-stream advertising platform that tailors advertisements and product information to the particular needs of an enterprise network, the survey, product education and switch promotion steps. The disclosed subject matter allows for confidentiality and security within any network. Advertisements provide the user with options to purchase necessary components, such as software, memory or disk drives, represented by the brands and purchase or lead steps. Advertisement revenue allows the software to be distributed for free or at a reduced cost to the end user.

Figure 23:
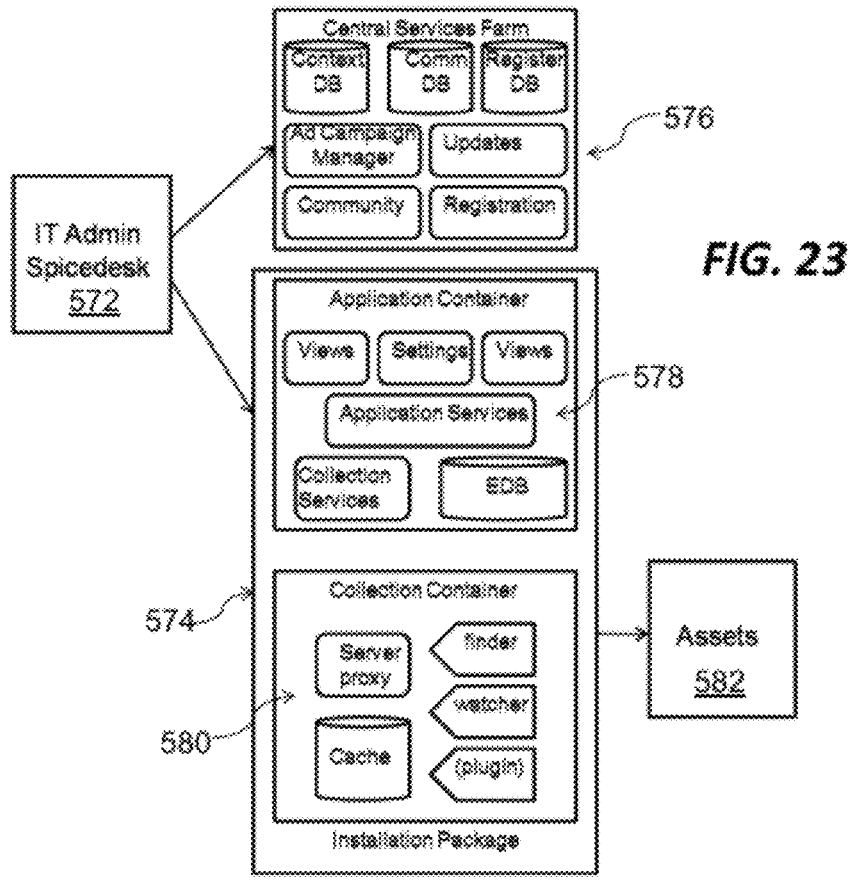
FIG. 23 shows how the presently disclosed system supports the activities of an IT network administrator.

FIG. 23 shows how the disclosed subject matter supports the activities of an IT network administrator. FIG. 23 depicts a user interface 572, typically manned by the IT administrator of the network. Software modules 574 and 576 are typically installed on a network to provide the functionality offered by the aspects of the present disclosure. Software engine 576 is typically hosted off-site from the user and gathers information from multiple users. Although in a far-flung world-wide organization, engine 576 may be implemented by a third-party for the benefit of the organization or by the IT department of the organization. The application engine 578 contains subroutines that provide the user with such functionality as views, setting, application services, collection of services and a host of other services. This list is meant to be exemplary and not limiting in any manner.

The collection engine 580 provides the user with server proxy, finder, watcher and third party functionality as aspects of the present disclosure. Engines 578 and 580 may be employed jointly in a network or separately. In a typical installation, engine 580 will be installed at multiple sites in a distributed network 582 or in a network that has several firewalls or security measures, downstream of them and then to provide retrieved information to the application engine 578. Although an IT administrator may change these settings, typically the application automatically determines the appropriate IP addresses, domain names or other information required to gather the information.

Figure 24:
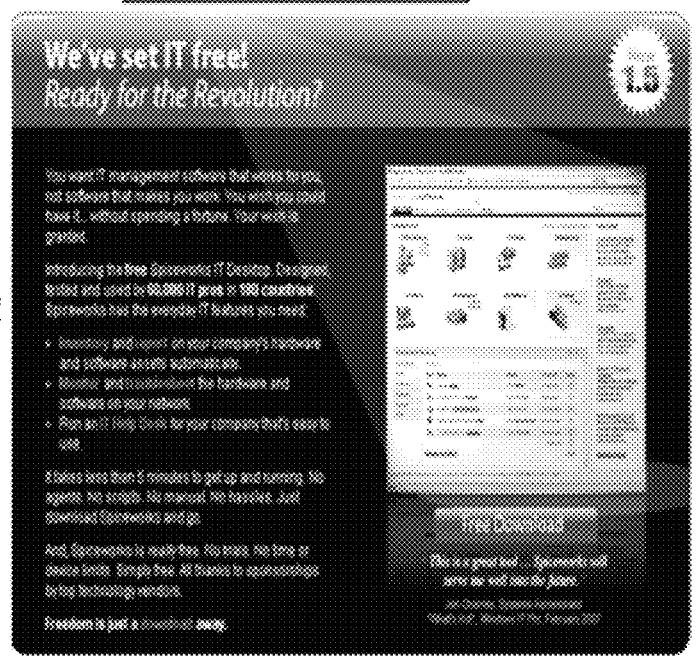
FIG. 24 shows an initial graphical user interface screen shot showing information with which a network administrator may download the presently disclosed IT network management system.

FIG. 24 shows an initial graphical user interface screen shot showing information on how a network administrator may download the software of the disclosed subject matter using a web browser.

Figure 25:
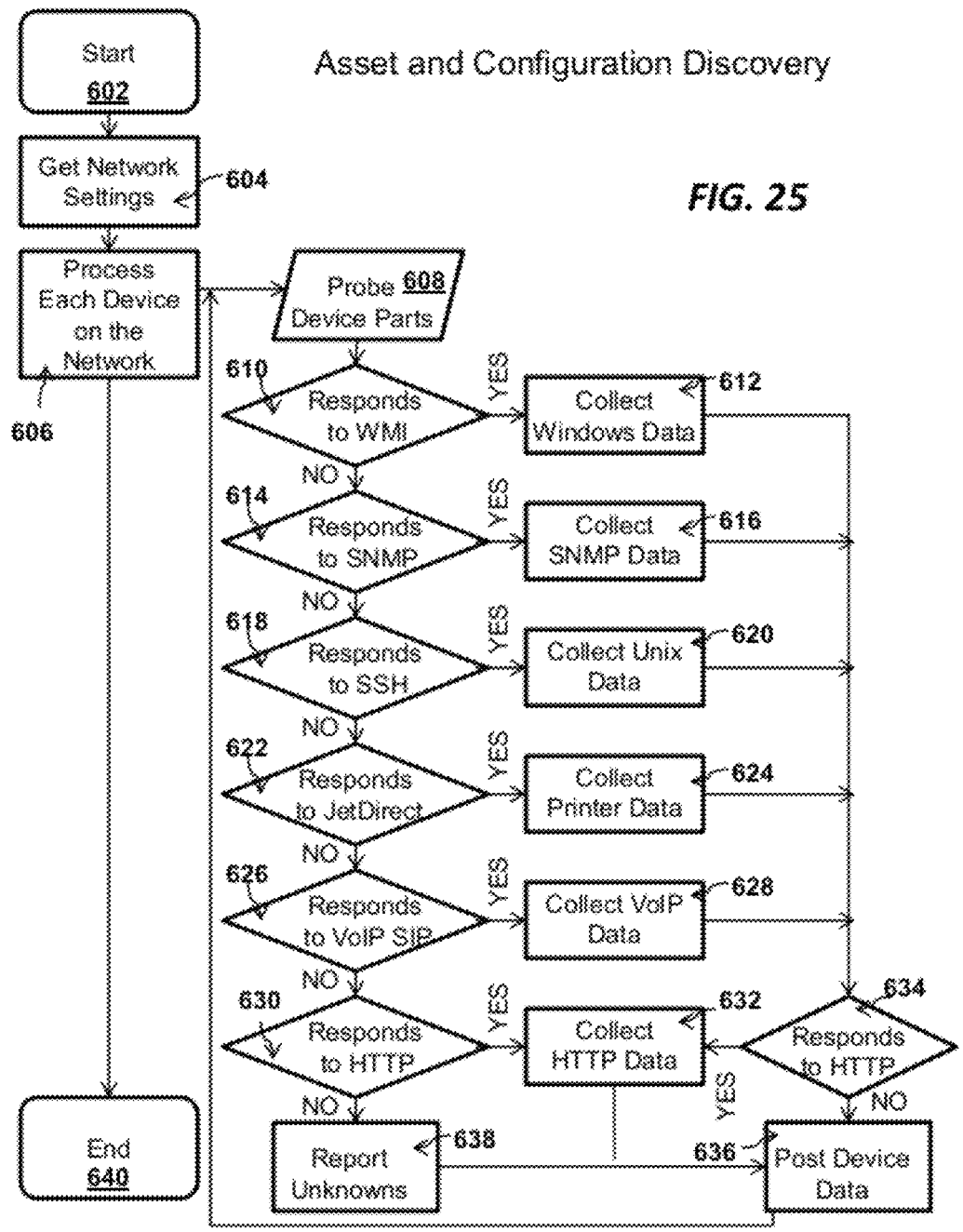
FIG. 25 presents a flow diagram for the asset and configuration discovery features of the disclosed subject matter.

FIG. 25 presents a flow diagram for the asset and configuration discovery features of the presently disclosed IT network management system;

FIG. 25 depicts a schematic flow diagram of the asset and configuration engine. In the scanning and discovery process, algorithms and parameters are initiated and launched as represent by start 602. Control then passes to obtain network settings 604. At this step information has been determined automatically but also may be provided to the application by the IT administrator, such as off-site IP addresses, domain names etc. that are part of the system and needs to be aggregated by central services engine are made accessible to be view by application engine.

This initial information may also include, any required security passwords or logins required to access some or all of the systems on the network. At step 604 the network settings are obtain as well as checking of the domain name and the DNS lookup in both directions. Any DNS errors found are aggregated into a top level view so that they later may be corrected by the IT administrator if desired.

An identifier for a computer or device on a TCP/IP network. Networks using the TCP/IP protocol route messages based on the IP address of the destination. The format of an IP address is a 32-bit numeric address written as four numbers separated by periods. Each number may be zero to 255. For example, 2.160.10.240 could be an IP address.

Within an isolated network, IP addresses may be assigned at random as long as each one is unique. However, connecting a private network to the Internet requires using registered IP addresses (called Internet addresses) as specified by networking standards. The four numbers in an IP address are used in different ways to identify a particular network and a host on that network. Four regional Internet registries—ARIN, RIPE NCC, LACNIC and APNIC assign Internet addresses from the following three classes. Class A—supports 16 million hosts on each of 126 networks; Class B—supports 65,000 hosts on each of 16,000 networks; and Class C—supports 254 hosts on each of 2 million networks.

In a 32-bit IP address, the number of bits used to identify the network and the host vary according to the network class of the address. In a Class C network, the first 3 bits, or the high-order bits, are always "110." The next 21 bits are used to define the Class C network, and the final eight bits are used to identify the host. The IP address is represented in dotted decimal notation of four 8-bit fields, or octets, that have been converted from binary to decimal numbers.

The number of valid networks and hosts available is always $2^N$ (where N equals the number of bits used) minus 2 (one for the all zeros address and one for the all ones address). Thus, for a class C address wherein 8 bits are available for hosts, the number of hosts is $2^8-2$, or 256–2, which is 254. Future version of this software will support Ipv6 which allows for a much greater range of IP addresses.

At step 604 a determination is made as to how wide the system is and to allocate search protocols based on this measure. For instance in a Class C network there are 254 potential hosts. Each device has or should have a unique IP address or sub-mask address. If an IP address or name is provided by the IT administrator, a DNS lookup takes place. The present disclosure confirms the DNS name and IP address associated with it and assures that the IP address defaults to the DNS name and vice-versa. This information is used later to present DNS issues to the user so that they can correct them. If an IP address or name is not provide the search engine 606 will the set the range based on the how wide the system is and ping each element to see if it responds. If an element does respond then it is probed to see if it is listed on one of the ports or is a unique name or IP address device. If the MAC address for this IP address can be determined, the registered vendor for this device is looked up and associated with the device. Even if no other information is gathered from the device, this can be useful when determining what actions to take when looking for rouge devices.

Having "ping"-ed an element and it responds, control then passes to step 608 where the element is probed. Although the following steps are listed in a logical and efficient manner for probing elements on a network, other groupings or searching hierarchies may be employed or plugged in later and not depart from the scope of the present disclosure.

At step 610 the device is probed to see if it responds to WMI. Windows Management Instrumentation (WMI) is a set of extensions to the Windows Management Instrumentation that provides an operating system interface through which instrumented components may provide information and notification. If the device is identified as a WMI device data is collected at step 612 and control passes to step 634 where a determination as to whether the device responds to HTTP is made (i.e., has a web server interface). Hypertext Transfer Protocol (HTTP) is a method used to transfer or convey information on the World Wide Web.

If the device is found to be a WMI at step 610 the remaining steps 610 through 630 are skipped, since by default the device will not respond to any of the other protocols. At step 614 the device is probed to see if it responds to SNMP. The simple network management protocol (SNMP) forms part of the internet protocol suite as defined by the Internet Engineering Task Force (IETF). SNMP is used by network management systems to monitor network-attached devices for conditions that warrant administrative attention. It consists of a set of standards for network management, including an Application Layer protocol, a database schema, and a set of data objects.

If at step 614 the device responds, it is identified as a SNMP device data is collected at step 616 and control passes to step 634 where a determination as whether the device responds to HTTP. The remaining steps 618-630 are skipped. The simple network management protocol (SNMP) forms part of the internet protocol suite as defined by the Internet Engineering Task Force (IETF). SNMP is used by network management systems to monitor network-attached devices for conditions that warrant administrative attention. It consists of a set of standards for network management, including an Application Layer protocol, a database schema, and a set of data objects.

At step 618 if the device responds, it is identified as a SSH device, data is collected at step 620 and control passes to step 634 where a determination as whether the device responds to HTTP is made. Steps 622-630 are skipped. Secure Shell or SSH is a set of standards and an associated network protocol that allows establishing a secure channel between a local and a remote computer. It uses public-key cryptography to authenticate the remote computer and (optionally) to allow the remote computer to authenticate the user. Shell commands are then used to obtain the needed information from the asset.

At step 622 if the device responds, it is identified as a JetDirect device, data is collected at step 624 and control passes to step 634 where a determination as whether the device responds to HTTP is made. Steps 626-630 are skipped. JetDirect is the name of a technology sold by Hewlett-Packard that allows computer printers to be directly attached to a Local Area Network. The most common communication uses TCP/IP port 9100.

At step 626 if the device responds, it is identified as a VoIP SIP, data is collected at step 628 and control passes to step 634 where a determination as to whether the device responds to HTTP is made. Voice over Internet Protocol, also called VoIP, IP Telephony, Internet telephony, Broadband telephony, Broadband Phone and Voice over Broadband is the routing of voice conversations over the Internet or through any other IP-based network.

At step 630 if the device responds, it is identified as an HTTP and data is collected at step 632. Control then passes to step 638, wherein if no response is received and exception report or alert is generated and forwarded to the IT administrator providing the directions as to how to handle these occurrences.

The reason the device failed to respond or did not respond fully, after being identified as being on the system could be numerous. In this instance the port is identified as being open but is identified as not showing anything on it. This could occur for various reasons, such as the user may not have the security clearance to access the system/device in question or a separate login is required that was not provided. The device may be behind a firewall or other device such a hub that will not respond. Any reasons found limiting this inventions ability to a certain important information for a given device are rolled up and presented with the data that was collected (such as the MAC address and registered manufacturer of the device) so that a user can correct or look into these issues.

Once the data is collected control then passes to step 636 wherein the data collect is posted with each device found on the network. Process steps 606 may be repeated again at a later time to discovery new network devices, but a report will only be generated for devices previously identified if the device configuration has changed. This information is stored on the system so that a history of the device may be created and used to compare with itself or other devices similarly configured and equipped.

This provides for a very efficient way of trouble shooting devices by being able to access a snap shot of a device that was previous working. It also provides the IT administrator the functionality and ability to ensure that each user on the system is appropriately configured with the software, hardware, peripheral access and etc. that their security level or access level requires or allows. Therefore, it a system bios or other parameters are changed and a problem occurs, the IT administrator may utilize this tool to identify the change in the systems configuration at take appropriate measures to resolve it.

Figure 26:
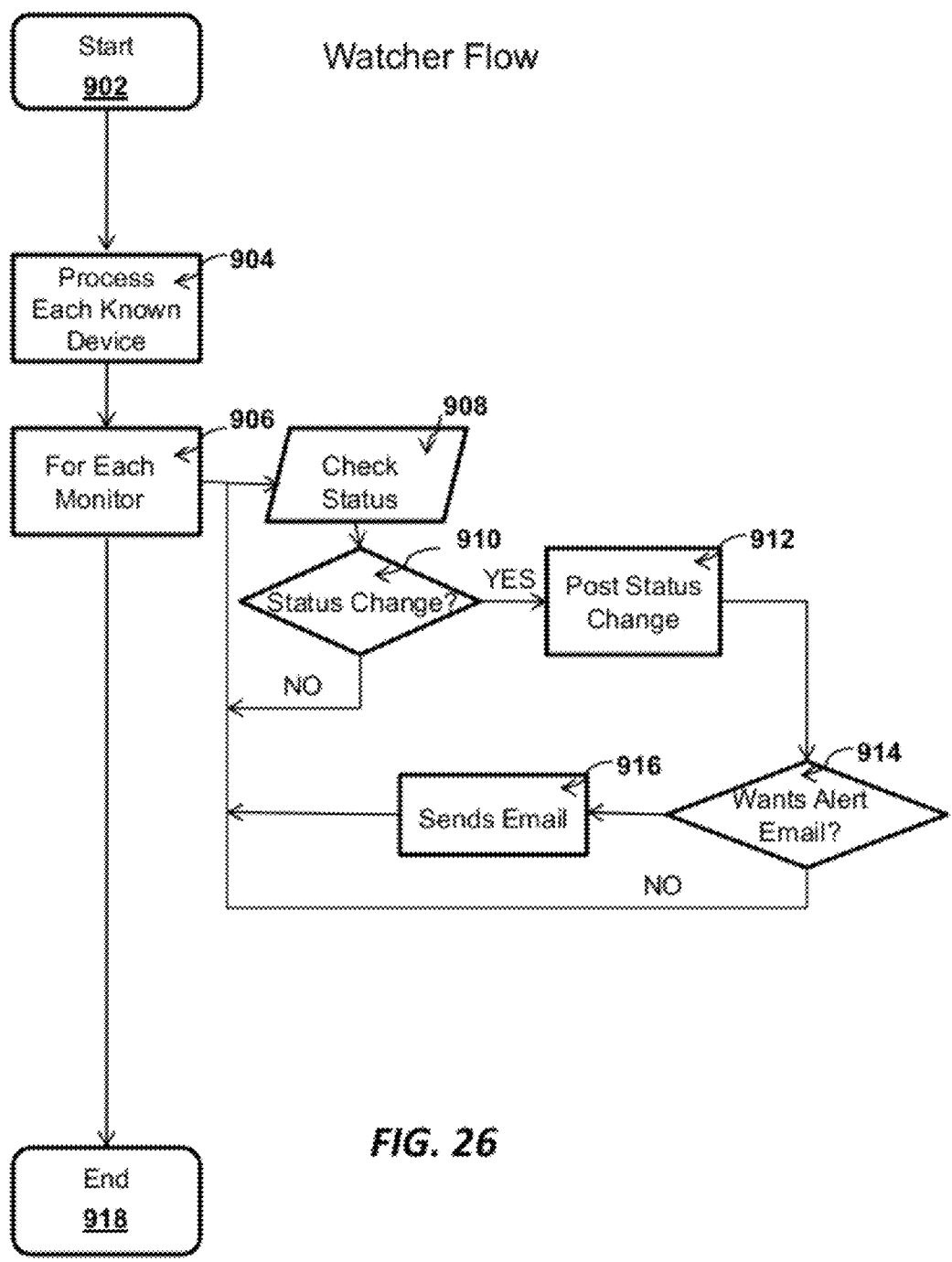
FIG. 26 presents a flow diagram for a watcher flow functions of the disclosed subject matter.

FIG. 26 presents a flow diagram for a watcher flow functions of using a schematic diagram of a watcher or monitoring engine. This aspect of the present disclosure monitors identified devices on the system at periodic times. It mainly looks for devices that switch states between online and offline and sends flags these events for the IT administrator as discussed below. For large organizations, the monitoring engine may segment the total number of devices and monitor each segment in a rotating fashion as not to over tax the operating systems. Although, this should not be a concern, since the data gathered and transmitted is on the order of 10s of K and require very little system resources to run. Therefore, in most instances the user will not even be aware of the programming scanning operation. Alternately, the present disclosure may be directed to only run when system resources are above a certain level (i.e. 60% or 80%) to ensure that productivity is not hampered by the scanning and transmitting of data process.

At step 902 the monitoring or watcher flow engine is initiated with the parameters set by the IT administrator. Control then passes to step 904 where each known device is processed. Control then passes to step 906 for each monitor where a check status request is initiated at step 908. If the result of the check status is a positive, i.e., the status has changed, the status change is posted to set 912. If the check status request is a negative, i.e., a no result, the process terminates.

Once the change is posted at step 912, control then passes to step 914, where a determination is made, in compliance with the IT administrator set up instructions, to send an email or some other type alert, such as creating an exception report, or log. If the determination at step 914 is a no, then the process terminates, although the data is still stored with the device showing the time of the last scan and its results. This data may remain indefinitely on the system or be periodically culled using a FIFO method over a set time period. If the instructions are affirmative at step 914 to send an email, control passes to step 916 where an email or some other type alert is direct to the party or parties designated by the IT administrator.

The watcher flow or monitoring engine continually performs the various described functions at the period intervals set up for the monitoring process until the process is terminated or altered by the IT administrator.

In summary, therefore, the present disclosure provides a method, system, and network, collectively the disclosure, providing hardware and software for provides a method, system, and network, collectively the disclosure, providing hardware and software for network and device event monitoring and reporting. The disclosed subject matter associates with a host computer, a local network of information technology devices, a community of network users, and a global information technology community. The present disclosure initiates an inventory of a plurality of information technology devices associated with a local network of information technology devices. The method, system and apparatus determine a change in the operational status of the plurality of the information technology devices associated with the local network. Then the present disclosure monitors for changes in the operational status of the plurality of the information technology devices associated with the local network. The disclosed subject matter then presents to the host computer information relating changes in the operational status of the information technology devices associated with the local network. The present method and system associate changes to the operational status with a plurality of products from a set of product vendors, and those changes to the operational status with a plurality of advertisements presented in association with plurality of products.

While the present disclosure has been described with respect to a limited number of embodiments, those skilled in the art, having benefit of this disclosure, will appreciate that other embodiments may be devised which do not depart from the scope of the present disclosure as described herein. Accordingly, the scope of the present disclosure should be limited only by the attached claims.

What is claimed is:

1. A method for interfacing the event monitoring and reporting of a host computer, a local network of information technology devices, a community of network users, and a global information technology community, comprising the steps of:
   downloading a local network monitoring software program from an online source onto a host computer system associated with said local network, said monitoring software program pre-configured with algorithms and parameters for automatic asset and configuration discovery of information technology devices associated with said local network from said host computer utilizing preexisting platform management systems and protocols on said information technology devices without the use of a client side agent associated to said local network monitoring software;
   initiating an inventory of a plurality of information technology devices associated with a local network of information technology devices from said host computer;
   determining a change in the operational status of said plurality of said information technology devices associated with said local network from said host computer;
   monitoring for changes in said operational status of said plurality of said information technology devices associated with said local network from said host computer;
   displaying information relating changes in said operational status of said information technology devices associated with said local network on said host computer;
   associating changes to said operational status of said plurality of said information technology devices with a plurality of products from a set of product vendors; and
   associating changes to said operational status with a plurality of advertisements presented in association with plurality of products.

2. The method of claim 1, further comprising the step of determining an event associated with a media access control (MAC) address for computers associated with said local network.

3. The method of claim 1, further comprising the step of determining an event associated with at least a subset of all servers, routers, printers and other IP-based devices, software packages, services, hot fixes, and patches associated said local network.

4. The method of claim 1, wherein said determining changes in the operation status step further comprises the step of determining a change in the status of all software programs, servers, routers, printers and other IP-based devices, software packages, services, hot fixes, and patches associated with said local network.

5. The method of claim 1, wherein said determining changes in the operational status step further comprises sorting all cables and ports associated with said local network by MAC addresses.

6. The method of claim 1, wherein said determining needs step further comprises the step of determining the particular needs of said host computer, and the perceived needs of said local network.

7. The method of claim 1, wherein said associating step further comprises the ability to access information technology devices, configurations, problems, and solutions of said user community.

8. The method of claim 1, wherein said directing step further comprises ability to access products and services of said global community in response to said changes in operational status of said plurality of said information technology devices.

9. A system for providing workflow monitoring and reporting interface of a host computer, a local network, a user community, and a global product and services community, comprising:

instructions operable on said host computer for automatic asset and configuration discovery of information technology devices associated with said local network from said host computer utilizing preexisting platform management systems and protocols on said information technology devices and without the use of a client side agent associated to said local network monitoring software, said instructions operable on said host computer for:

retrieving information based on the network assets associated with said local network;

monitoring events relating to changes in work-flow of said network assets associated with said local networks;

determining needs of said local network in response to events occurring on network assets associated with said local network;

displaying events relating to work-flow changes in association with said network assets;

directing said host computer to research and purchase resources for said local network of said information technology devices; and driving advertisements to said host computer, said advertisements providing services similar to said needs of said local network.

10. The system on claim 9, wherein said instructions for retrieving information further comprise a process running on said network, and information technology devices associated with said local network for reporting events occurring on said network assets.

11. The system of claim 9, wherein said instructions for retrieving information further comprises generating reports, flags and alerts of said network assets in response to operational changes occurring on said network assets.

12. The system of claim 9, wherein said instructions for determining needs further comprises instructions determining the particular needs of said user of said host computer, and perceived needs of said local network.

13. The system of claim 9, wherein said instructions providing information further comprises instructions for monitoring web-server activity of said informational technology devices associated with said local network.

14. The system of claim 9, wherein said instructions providing the user information further comprises instructions for monitoring general activity of said informational technology devices associated with said local network.

* * * * *